(12) United States Patent
Sedeffow

(10) Patent No.: US 10,181,215 B2
(45) Date of Patent: Jan. 15, 2019

(54) GENERATING A VIRTUAL MAP

(71) Applicant: EyeSpy360 Limited, London (GB)

(72) Inventor: Peter Vassilev Sedeffow, London (GB)

(73) Assignee: EyeSpy360 Limited, London (GB)

( * ) Notice: Subject to any disclaimer, the term of this patent is extended or adjusted under 35 U.S.C. 154(b) by 0 days.

(21) Appl. No.: 15/473,773

(22) Filed: Mar. 30, 2017

(65) Prior Publication Data

US 2018/0286121 A1  Oct. 4, 2018

(51) Int. Cl.
*G06T 19/00*  (2011.01)
*G06T 15/10*  (2011.01)
*G06T 15/04*  (2011.01)
*G06T 3/00*  (2006.01)

(52) U.S. Cl.
CPC ............ *G06T 15/10* (2013.01); *G06T 3/0062* (2013.01); *G06T 15/04* (2013.01); *G06T 2210/04* (2013.01)

(58) Field of Classification Search
None
See application file for complete search history.

(56) References Cited

U.S. PATENT DOCUMENTS

| 9,244,940 | B1 * | 1/2016 | Donsbach | G06T 11/20 |
| 2002/0118890 | A1 * | 8/2002 | Rondinelli | G06T 3/0062 |
| | | | | 382/276 |
| 2010/0079465 | A1 * | 4/2010 | Hsu | G06T 11/60 |
| | | | | 345/443 |
| 2014/0053077 | A1 * | 2/2014 | Unnikrishnan | G06F 3/04815 |
| | | | | 715/747 |
| 2014/0168475 | A1 * | 6/2014 | Corkery | G03B 37/04 |
| | | | | 348/239 |
| 2016/0073022 | A1 * | 3/2016 | Kimura | G06T 3/0012 |
| | | | | 348/36 |

* cited by examiner

*Primary Examiner* — Frank S Chen
(74) *Attorney, Agent, or Firm* — James Creighton Wray

(57) ABSTRACT

A method of generating and displaying a virtual map is provided. First and second images are obtained, each image representing a physical space, which may have an equirectangular projection. For each of these images, a projection is generated and output for display. These projections may be circular, and may have a smaller blank circle at the center. Indications are received, possibly via manual input, representing a point in each projection. These are stored in position data, which includes identifications of the points and an indication that the two points are connected. Multiple points in multiple projections may be identified and stored in the position data. First and second display projections of the images are rendered for display, each including a display element corresponding to the identified position within each image. These display projections are outputted for display as a virtual map. While viewing the virtual map, if manual input is received selecting a display element in one display projection, the display projection having the corresponding display element is automatically displayed.

14 Claims, 27 Drawing Sheets

GENERATING A VIRTUAL MAP

CROSS REFERENCE TO RELATED APPLICATIONS

This application represents the first application for a patent directed towards the invention and the subject matter.

BACKGROUND OF THE INVENTION

The present invention relates to a method and system for generating and displaying a virtual map.

It is possible to create computer-generated and computer-viewable "virtual tours" of physical spaces, which allow a viewer to move virtually through a space in the same way as they would walk through it. These virtual tours have many potential uses. For example, real estate agents could provide a virtual tour of a property for sale in order to attract more buyers. This may be particularly useful if a property is remotely-located, if potential buyers are not local, or for properties such as yachts which are not easily visited. Places of interest such as historical sites and museums could offer virtual tours, in order to provide an experience to persons who are unable to visit. Facilities such as gyms and sport clubs could offer a virtual tour on their website to entice people to sign up for membership. Many more uses are envisaged.

However, the present technology requires such virtual tours to be rendered from floor plans or architectural designs. This can be an expensive process, requiring the services of a surveyor or architect, and using specialist rendering software. There is therefore a need for a system that creates a virtual tour easily and cheaply.

BRIEF SUMMARY OF THE INVENTION

According to an aspect of the present invention, there is provided a method of generating and displaying a virtual map. First and second images are obtained, each image representing a physical space, which may have an equirectangular projection. For each of these images, a projection is generated and output for display. These projections may be circular, and may have a smaller blank circle at the centre. Indications are received, possibly via manual input, representing a point in each projection. These are stored in position data, which includes identifications of the points and an indication that the two points are connected. Multiple points in multiple projections may be identified and stored in the position data. First and second display projections of the images are rendered for display, each including a display element corresponding to the identified position within each image. These display projections are outputted for display as a virtual map. While viewing the virtual map, if manual input is received selecting a display element in one display projection, the display projection having the corresponding display element is automatically displayed.

According to another aspect of the invention, there is provided apparatus for generating and supplying a virtual map, including a processor and a memory. The processor is configured to obtain first and second images, each image representing a physical space. For each of these images, the processor generates a projection and outputs it for display. These projections may be circular, and may have a smaller blank circle at the centre. The processor receives indications representing a point in each projection, and stores them in position data, which includes identifications of the points and an indication that the two points are connected. Multiple points in multiple projections may be identified and stored in the position data. The processor supplies the images and position data for display as a virtual map.

According to a third aspect of the invention, there is provided a method of displaying a virtual map. Virtual map data, comprising images and position data, is received. The position data includes identifications of positions within said images and an indication that pairs of positions are linked. A first display projection, derived from a first image, is output for display, including a first display element corresponding to a position in said first image identified in the position data. Manual input is received selecting the first display element, and in response to this a second display projection is output for display. This is derived from a second image and includes a second display element corresponding to a position in said second image identified in the position data. The second display projection is orientated so that it is from the point of view of the second display element.

DETAILED DESCRIPTION OF EXAMPLE EMBODIMENTS

FIG. 1

Figure 1:
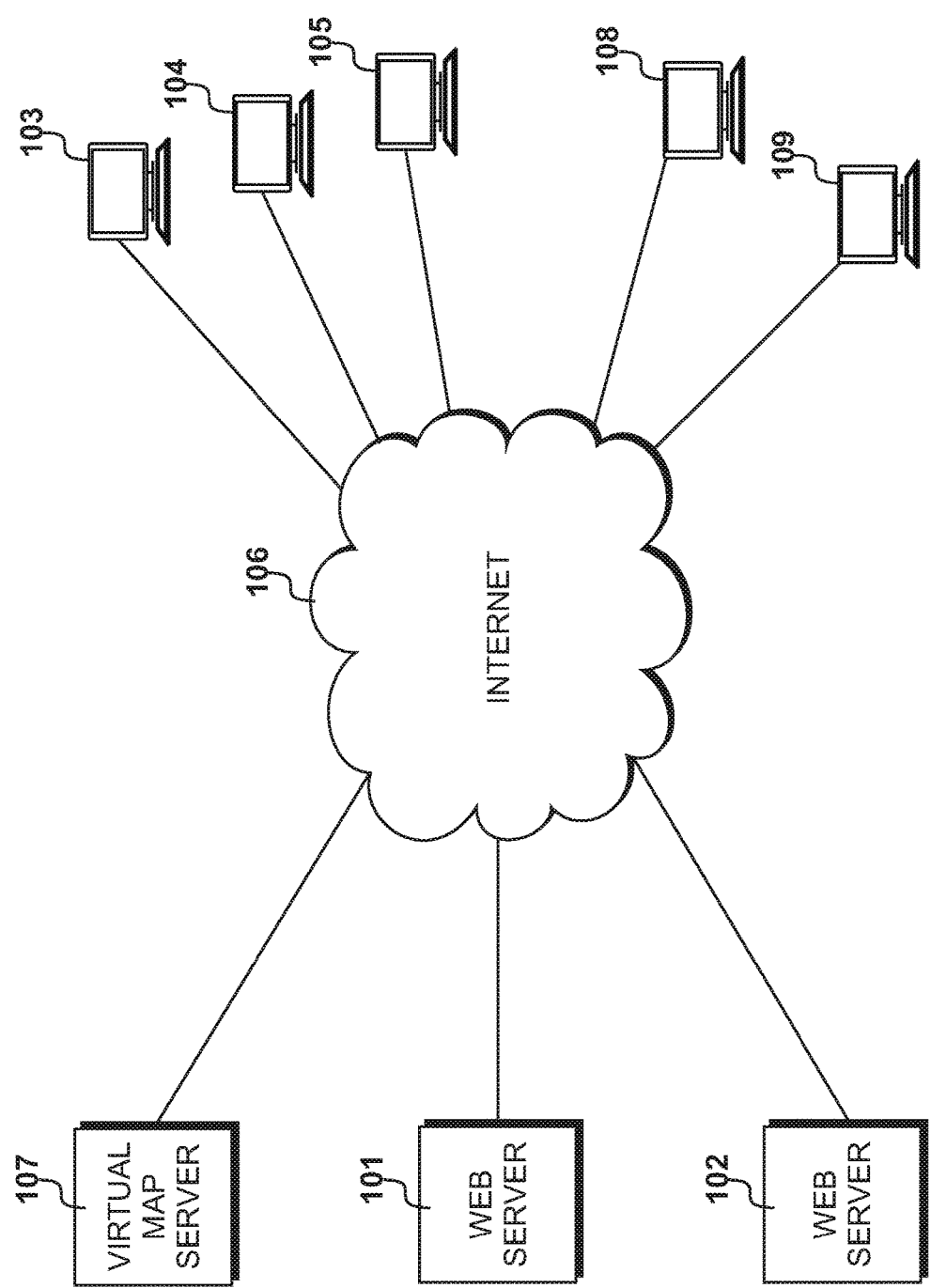
FIG. 1 shows an environment in which the invention may be used.

FIG. 1 shows an environment in which the invention described herein may be used. Web server 101 hosts the website of a first business, and web server 102 hosts the website of a second business. Both of these websites have at least one virtual map embedded in it. Customers 103, 104, and 105, browsing internet 106 on any computing device, such as a desktop computer, laptop, tablet, mobile phone, or any other device, wish to view the virtual maps. The embedded maps are retrieved from virtual map server 107 and returned to the browsing customers over the internet 106.

Users 108 and 109 create and maintain the virtual maps by communicating over internet 106 with virtual map server 107. Again, users 108 and 109 may be using any type of computing device. The virtual maps described herein can be created on anything from a smartphone to a high-powered desktop publishing computer.

For the purposes of clarity, the terminology will be used consistently herein that users create virtual maps and customers access them.

In the embodiment described herein, the virtual maps are hosted on virtual map server 107 and the relevant websites contain an embedded link. However, the virtual maps could also be hosted on the individual web servers or in some other location.

FIG. 2

Figure 2:
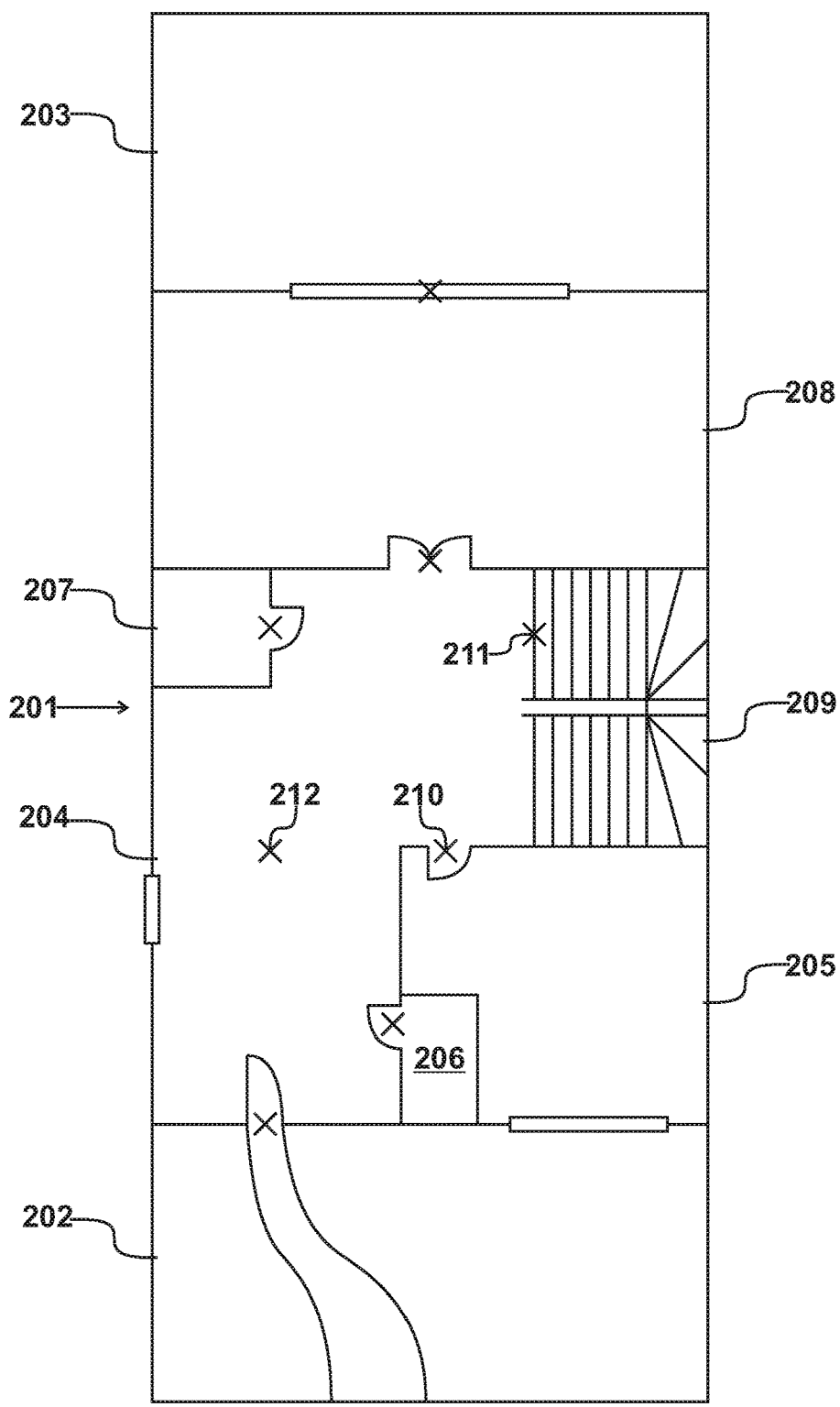
FIG. 2 shows a floor plan of a space to be mapped.

FIG. 2 shows a floor plan of the ground floor of a house for which a virtual map is to be created. It consists of the house 201, which has a front garden 202 and a back garden 203. The rooms on this floor of the house include an entrance hall 204, a study 205, a cloakroom 206, a bathroom 207, and a living room 208. Doors connect each of these rooms. In addition there is a front door to the front garden 202, while the back garden 203 is accessed by sliding doors in the living room 208. Stairs 209 lead to the first floor.

In known virtual tours, an architectural layout of the house would be combined with photographs in order to render a tour. However, the invention described herein provides a method of linking a set of panoramic photographs. A panoramic photograph is a rectangular photograph that represents a 360° view of a space. In the embodiment described herein, spherical photographs are used, which also show the floor and ceiling. However, in other embodiments, basic panoramic photographs could be used.

Photographs are taken of each room to be included in the tour. In some cases two photographs of a room may be appropriate. Thus, returning to the example in FIG. 2, one photograph is taken of each of front garden 202, back garden 203, study 205, cloakroom 206, bathroom 207 and living room 208. Two photographs are taken of entrance hall 204, because it is an L-shape.

Connection points are then defined between the photographs. Thus, for example, point 210 indicates the door from the entrance hall into the study. This point would be marked by the user both on the photograph of the study 205 and on the photograph of the entrance hall 204. All the connection points marked with a cross on this figure would be similarly defined as connections between two photographs. Point 211, which is at the bottom of the stairs, would be linked with a photograph of the landing on the first floor, should the user wish to add the first floor to the virtual tour.

The set of images and the connection point information is all that is necessary to create a virtual map. The images and the connection points can be rendered into a viewable tour of the house which allows users to panoramically view each room before moving into the next.

FIG. 3

Figure 3:
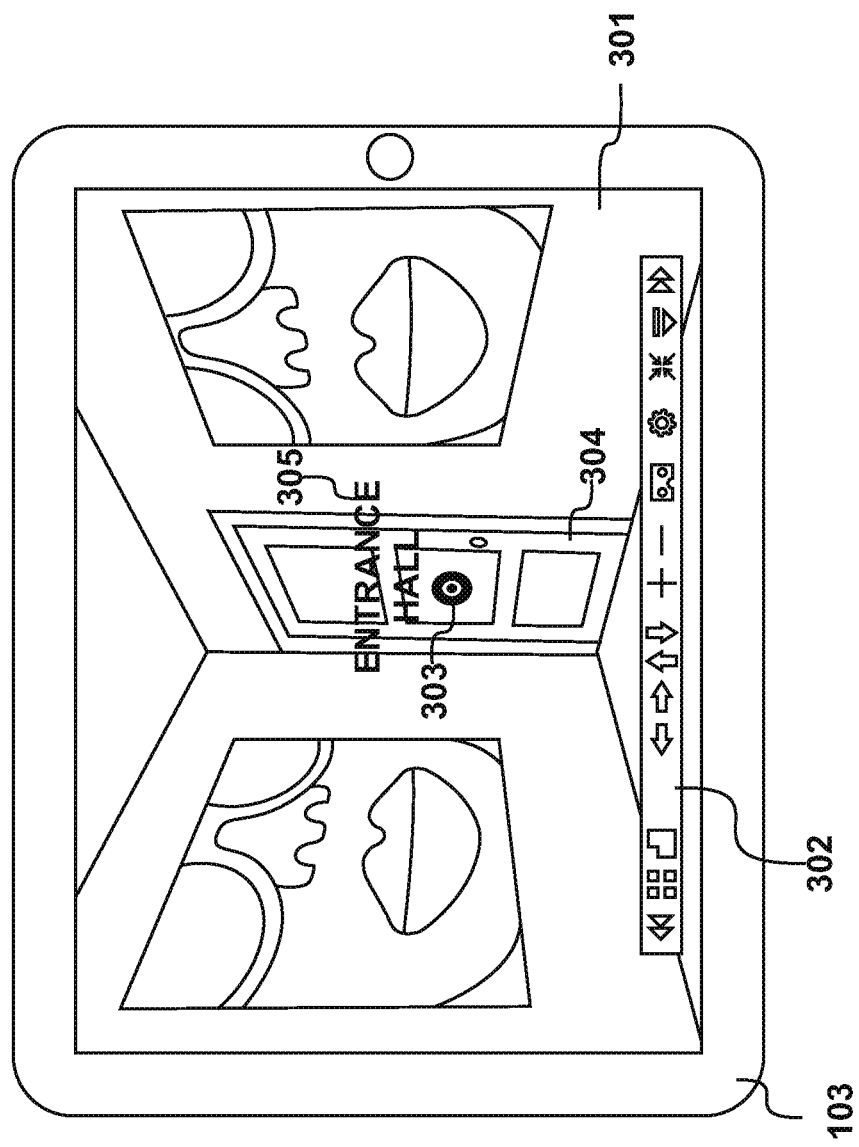
FIG. 3 is an illustration of a virtual map displayed on a tablet shown in FIG. 1.

FIG. 3 is an illustration of a virtual map displayed on a tablet. This is identified as the device 103 used by a customer in FIG. 1. The interface includes image viewer 301 and toolbar 302.

The image currently being displayed within image viewer 301 is of study 205. Connection point 210 is visible as a target-shaped icon 303 on door 304. Text 305 indicates that this is the door to entrance hall 204.

The customer may move the panoramic image around in any way appropriate to the device being used. Thus if the device has a touchscreen or touchpad, the image may be intuitively moved around using a finger. On a computer, the mouse may be used or the keyboard. On a handheld device the accelerometers could be used to move the image dependent upon the movement of the device. Alternatively, arrows on toolbar 302 may be used.

When the customer has viewed as much of this room as is required, icon 303 may be selected, in any way appropriate to the device being used, in order for a panoramic image of entrance hall 204 to be displayed.

On reviewing FIG. 2, it can be seen that in this next image of the entrance hall, five icons representing connection points would be displayed, allowing the customer to choose to view the other half of the entrance hall, to move back into the study, to view the bathroom or the living room, or to go upstairs. In each case, wherever the customer selects a connection point, the image of the next room is orientated from the point of view of the corresponding connection point, i.e. as if the viewer were standing directly in front of the connection point. Thus, the customer has the experience of simply stepping through the door or other connection point, and so this system provides a customer with a intuitive and seamless method of moving through the space.

As can be seen in FIG. 2, although doorways represent natural connection points between images, sometimes connection points may be in the middle of a space, such as connection point 212 that connects two images of entrance hall 204. In a large open plan space, for example a gym or a garden, most connection points would be of this type.

FIG. 4

Figure 4:
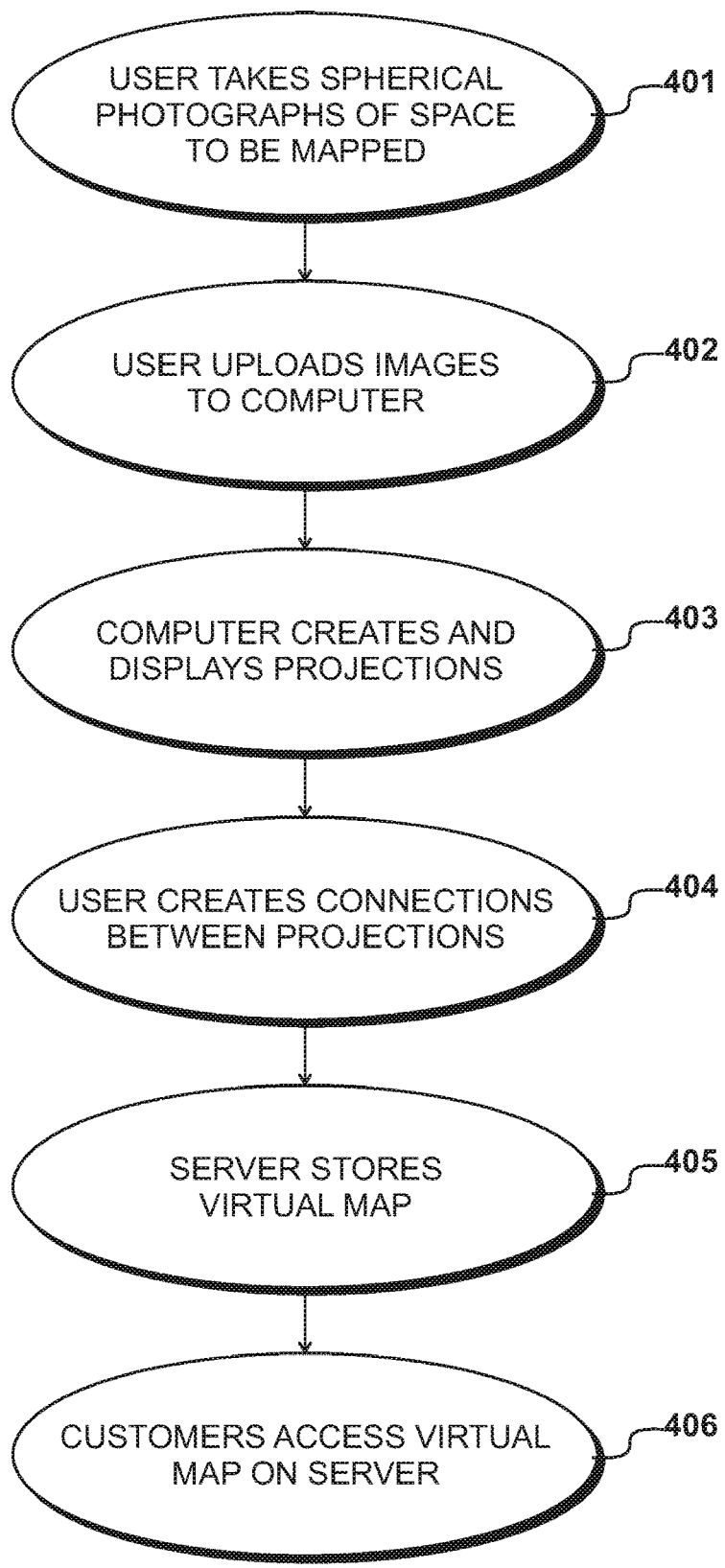
FIG. 4 details steps carried out to create and display a virtual map.

FIG. 4 is a flowchart showing the workflow of the creation and viewing of a virtual map. At step 401 a user takes spherical photographs of a space to be mapped. As previously described, panoramic images may be used, but in the preferred embodiment spherical photographs are used that allow the customer to see every part of the space.

At step 402 the user uploads images to their computing device, and at step 403 the device creates and displays projections of these images that enable the user to create connections between them, which the user does at step 404. The images and connections together define the virtual map, which is rendered and stored at server 107 at step 405. At step 406 customers access the virtual map on server 107, usually via webserver 101 or 102.

FIG. 5

Figure 5:
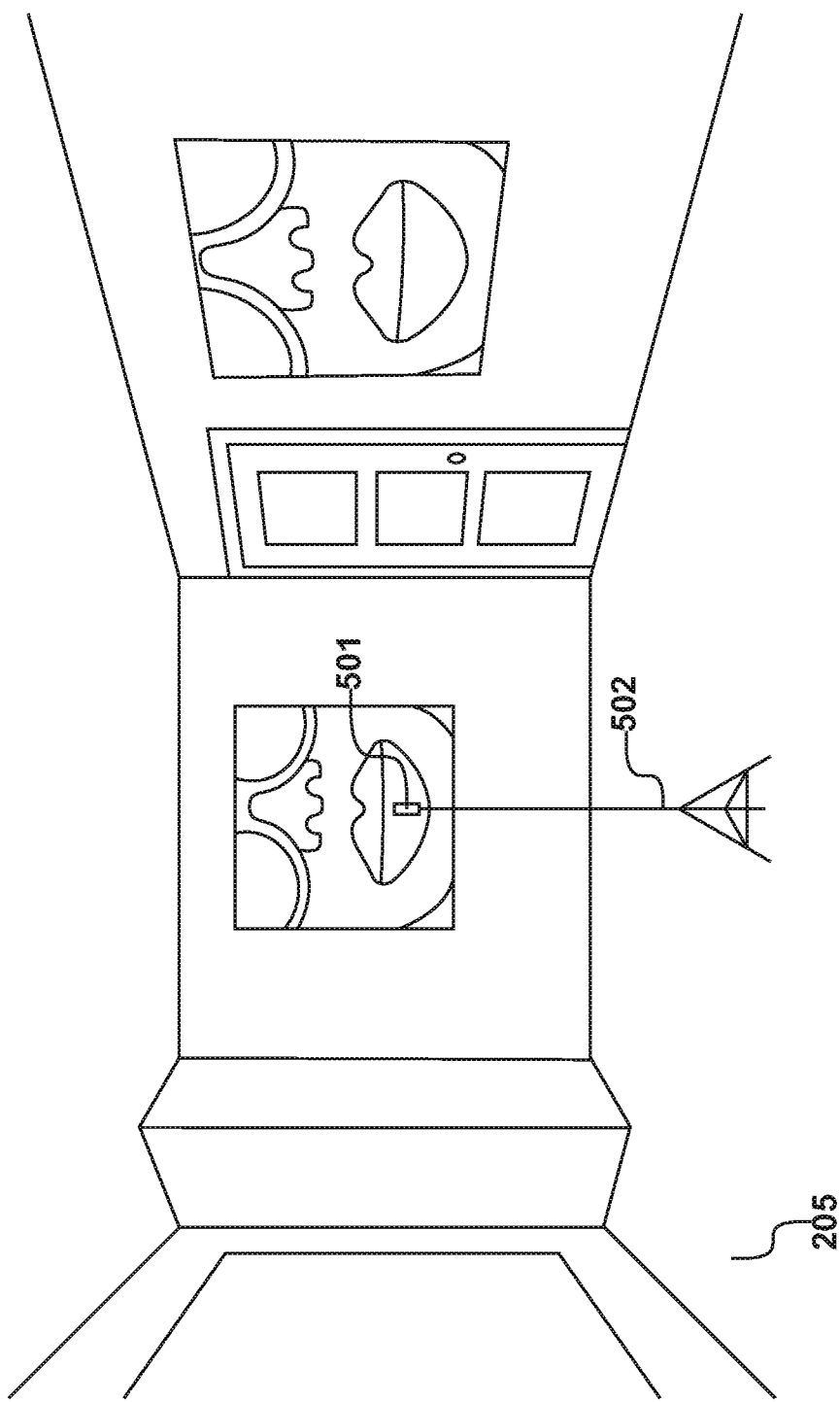
FIG. 5 illustrates a spherical camera photographing a room.

FIG. 5 illustrates a spherical camera 501, mounted on a tripod 502, taking a spherical photograph of study 205. A typical spherical camera has two cameras back to back with a fisheye lens on each. However, any camera that obtains a spherical photograph can be used. In this embodiment the images are all in 2-D, but the invention can be equally applied to 3-D images.

FIG. 6

Figure 6:
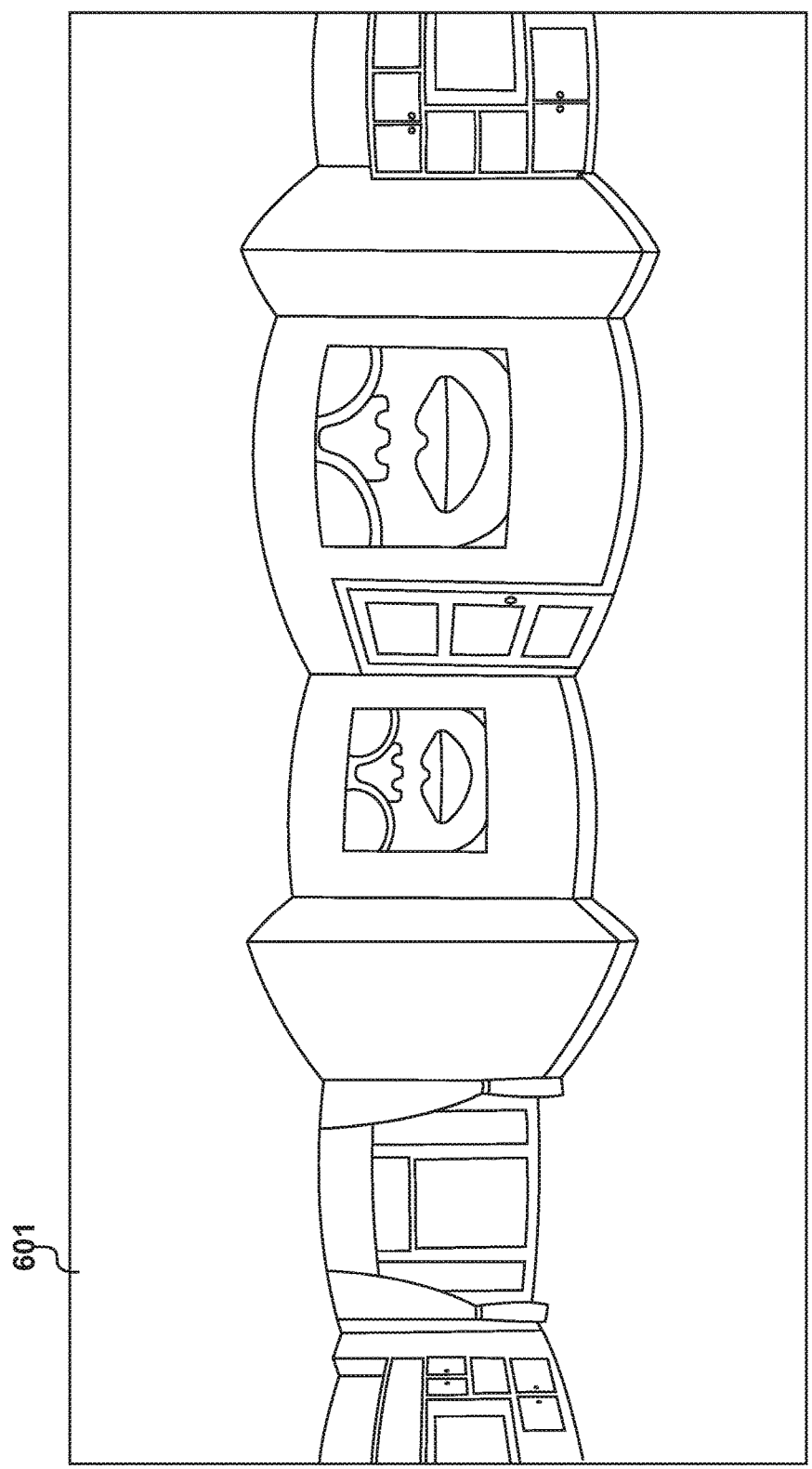
FIG. 6 illustrates a spherical photograph taken by the camera shown in FIG. 5.

FIG. 6 illustrates the spherical photograph of study 205 taken by camera 501. It is an equirectangular projection, which is the typical output of a spherical camera. The ceiling and the floor are stretched, but the walls are mainly in proportion. This is the format of the images that are uploaded and used as the basis of the virtual map.

FIG. 7

The various components of the environment shown in FIG. 1 and the steps performed will now be described. FIGS. 7 to 10 describe virtual map server 107, FIGS. 11 to 23 describe the creation of a virtual map, and FIGS. 24 to 27 describe the viewing of a virtual map.

Figure 7:
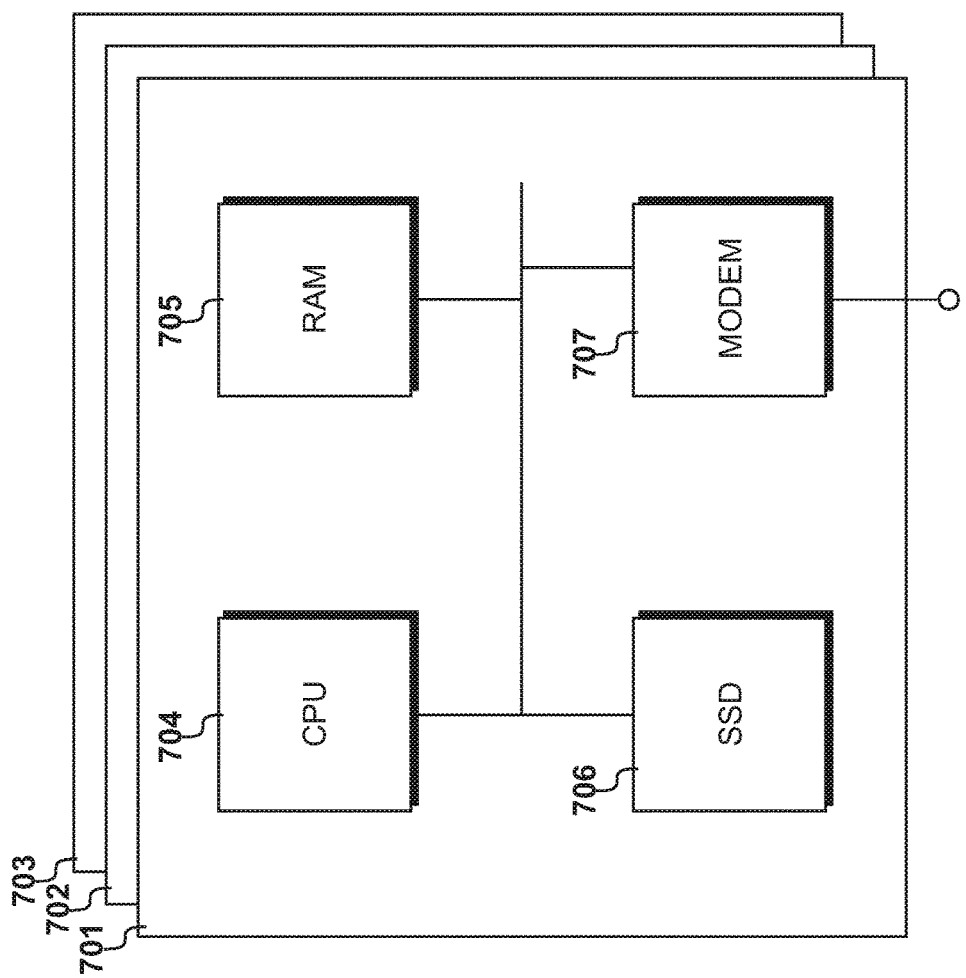
FIG. 7 is a diagram of a server shown in FIG. 1.

FIG. 7 is a block diagram of virtual map server 107. It is a server farm comprising three servers 701, 701 and 703. Any suitable number of servers can be used, including a single server. In this example, server 701 includes a processor which in this example is CPU 704, processor memory provided by RAM 705, a data storage medium which in this example is SSD 706, and an interface provided by modem 707. Any suitable server architecture may be used. Using current technology, a wired connection is necessary in order to serve the data over internet 106, but in the future a wireless connection could be used.

FIG. 8

Figure 8:
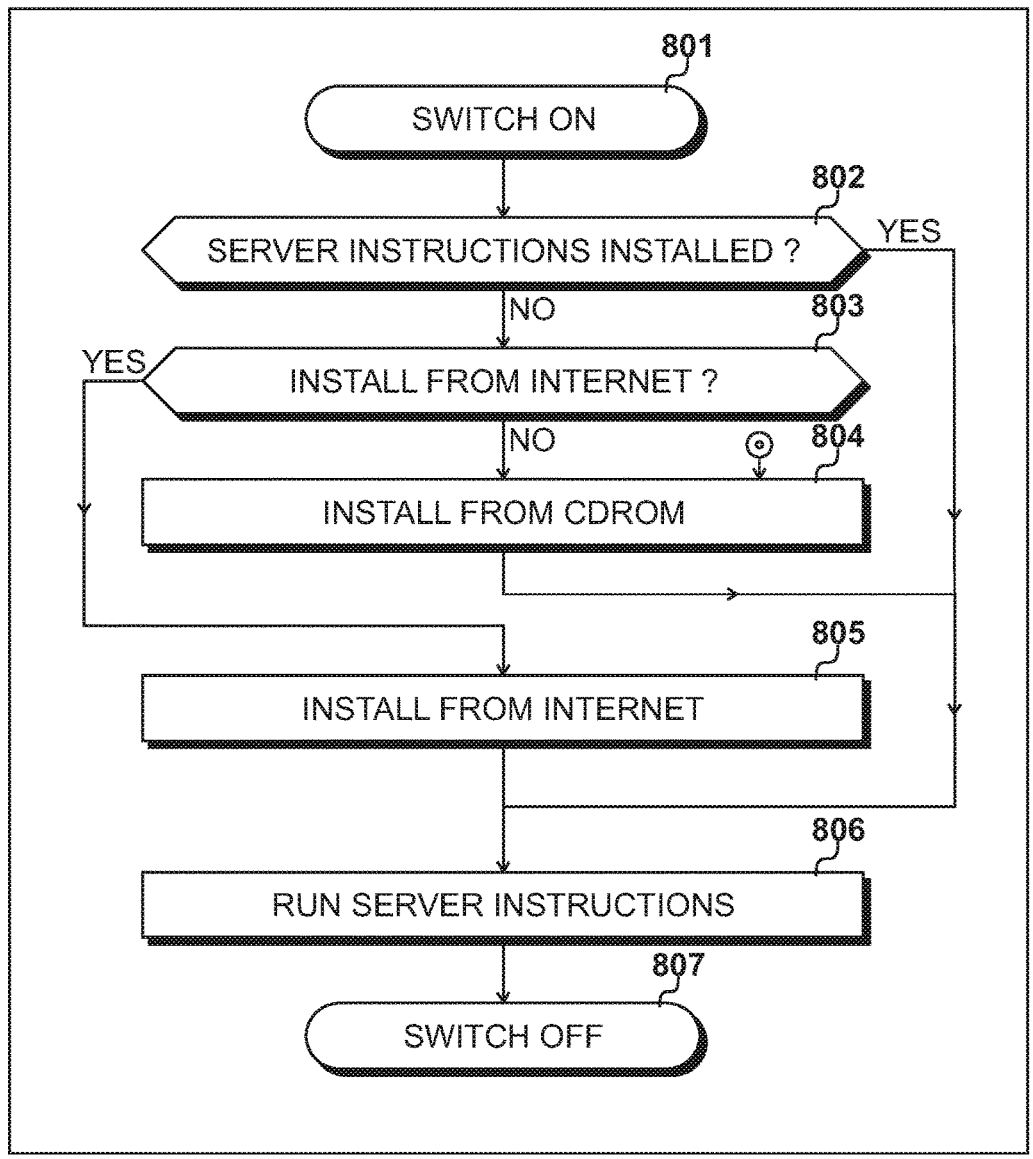
FIG. 8 shows steps carried out by a processor shown in FIG. 7.

FIG. 8 shows steps carried out by server 107 to create, store and supply virtual maps. At step 801 the server is switched on and at step 802 a question is asked as to whether the necessary instructions are already installed. If this question is answered in the negative then at step 803 a further question is asked as to whether the instructions should be installed from the internet. If this question is also answered in the negative then at step 804 instructions are installed from a portable storage medium, which could be CD-ROM 805 or some other storage such as a flash drive. If the question asked at step 803 is answered in the affirmative, then at step 805 the instructions are installed from a remote location connected via internet 106.

Following this, and if the question asked at step 802 is answered in the affirmative, to the effect that the instructions already installed, then at step 806 the server instructions are run. The server is typically left running until maintenance is required, at which point it is switched off at step 807.

FIG. 9

Figure 9:
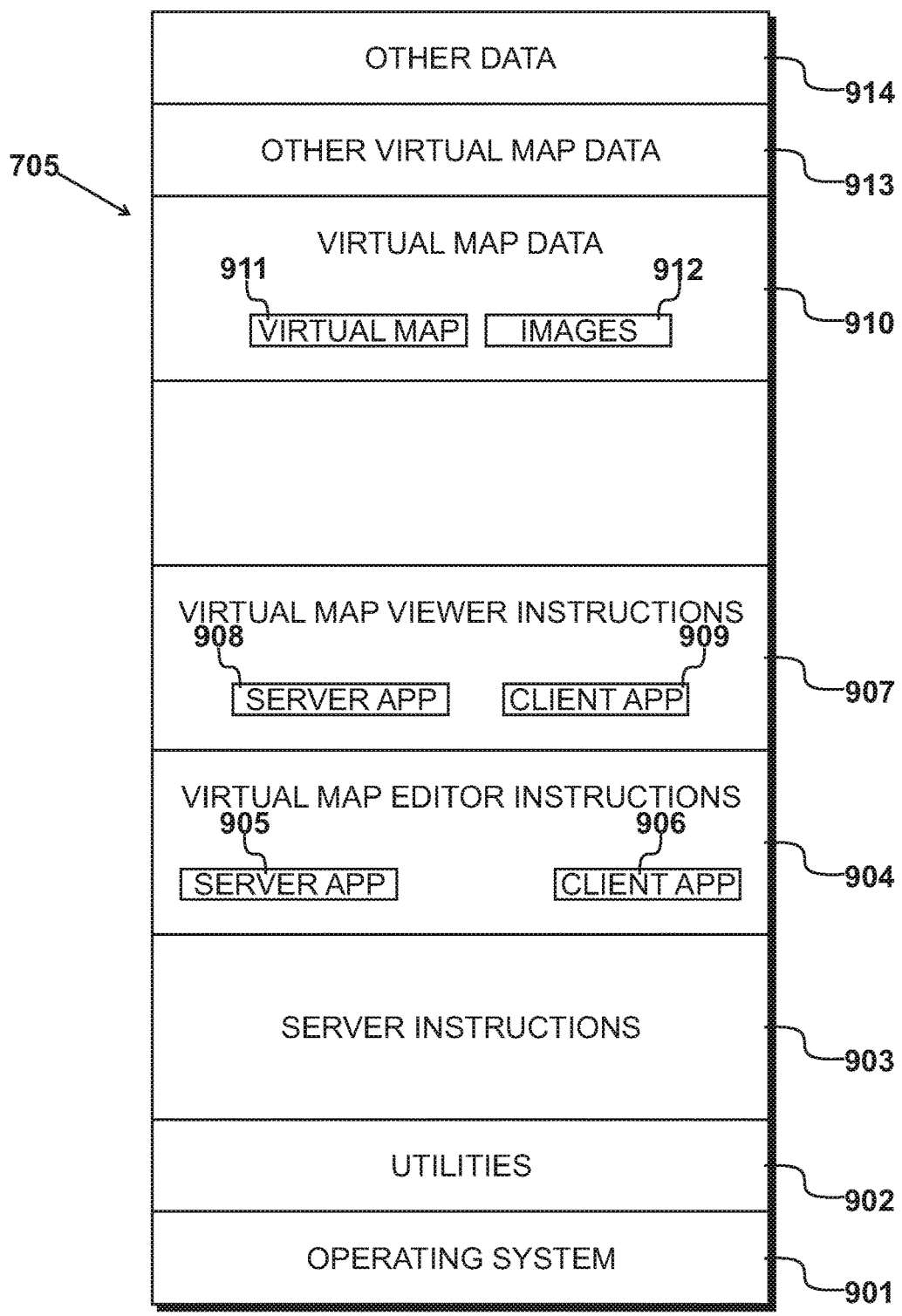
FIG. 9 shows the contents of a memory shown in FIG. 7.

The contents of memory 705 while server 107 is running instructions at step 806 are shown in FIG. 9. At level 901 is the basic operating system, with utilities present at 902 and the server instructions at 903. Preferably the server operates an application with a modular structure, so that it has the ability to work in conjunction with additional server-side instructions, and also to serve client-side instructions to the devices 101, 102, 103, 107 and 108.

Within virtual map editing instructions 904 there are instructions for the server-side editing application 905 that runs on server 107, along with instructions for the client-side editing application 906 that are supplied to a requesting client. Similarly, contained within the virtual map viewer instructions 907 is the server-side viewer application 908 and the client-side viewer application 909. In both cases, the server-side application operates in a dialogue with the client-side application, so that the user or customer can perform actions seamlessly.

Stored on server memory 705 is virtual map data 910. This includes the virtual map definitions 911, comprising image and connection data, and the equirectangular images 912. A virtual map is rendered by displaying a number of images 912 in accordance with data from definitions 911. All the map data currently being accessed by users or customers is stored in map data 910. Preferably, when a user is editing a virtual map, the data being created on the user's computing device is regularly synchronised with that stored at 910, so that a user can interrupt a session and pick it up later, possibly on a different device.

Additionally, all map data, including that not currently accessed, is stored within main memory 706.

At 913 there is other virtual map data and at 914 there is other data used by the server.

FIG. 10

Figure 10:
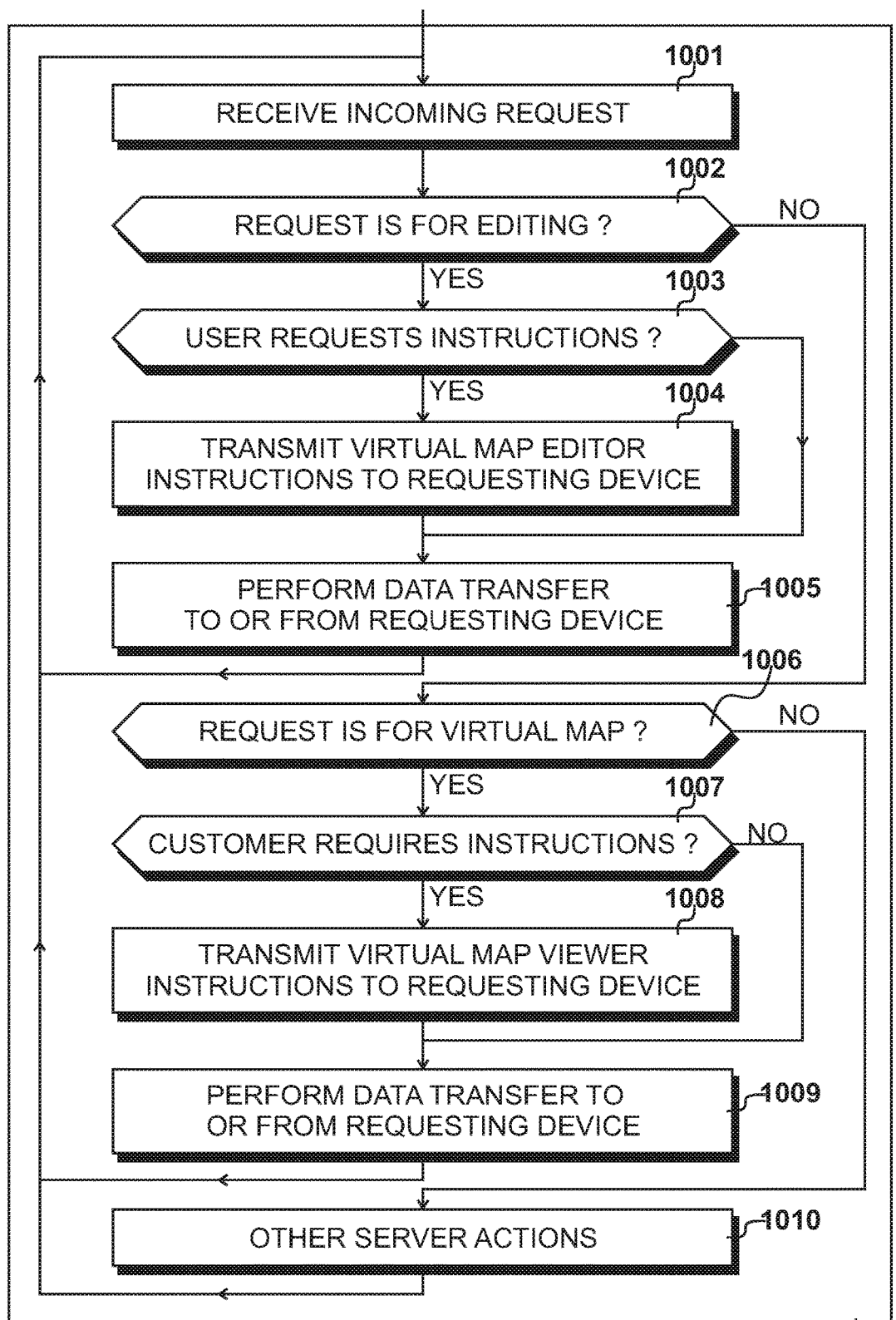
FIG. 10 details steps carried out during FIG. 8 to carry out server instructions.

FIG. 10 details step 806 at which the server carries out its instructions. Server 107 mainly responds to user requests to edit a virtual map and customer requests to supply a virtual map. Thus at step 1001 a request is received. This may be received directly, or if server 701 is part of a server farm it may be received via a traffic manager or other routing system.

At step 1002 a question is asked as to whether the request is from a user wishing to create or edit a virtual map, and if this question is answered in the affirmative then at step 1003 a further question is asked at to whether the user needs to download the instructions for the client-side editing application 906. If this question is answered in the affirmative then at step 1004 virtual map editor instructions 906 are transmitted to the requesting device. At this point, and if the question asked at step 1003 is answered in the negative, to the effect that the user does not require instructions, then a session is created to perform data transfer to or from the requesting device. The user's side of these steps will be detailed further with respect to FIG. 12.

At step 1006 a question is asked as to whether the incoming request is for supply of a virtual map, and if this question is answered in the affirmative then at step 1007 a question is asked as to whether the customer needs to download the instructions for the client-side viewer application 909. If this question is answered in the affirmative then at 1008 virtual map viewer instructions are transmitted to the requesting device. At this point, and if the question asked at step 1007 is answered in the negative, to the effect that the customer does not require instructions, then at step 1009 a session is opened to perform data transfer to and from the requesting device. The customer's side of these steps will be described further with respect to FIG. 25.

If the incoming request is neither for the editing or the supply of a virtual map, then at step 1010 other server actions are performed. These include HTML and CSS serving, user account login, session cleanup, and so on. This loop continues until the server processes are interrupted by an operation such as the powering down of the server.

FIG. 11

Figure 11:
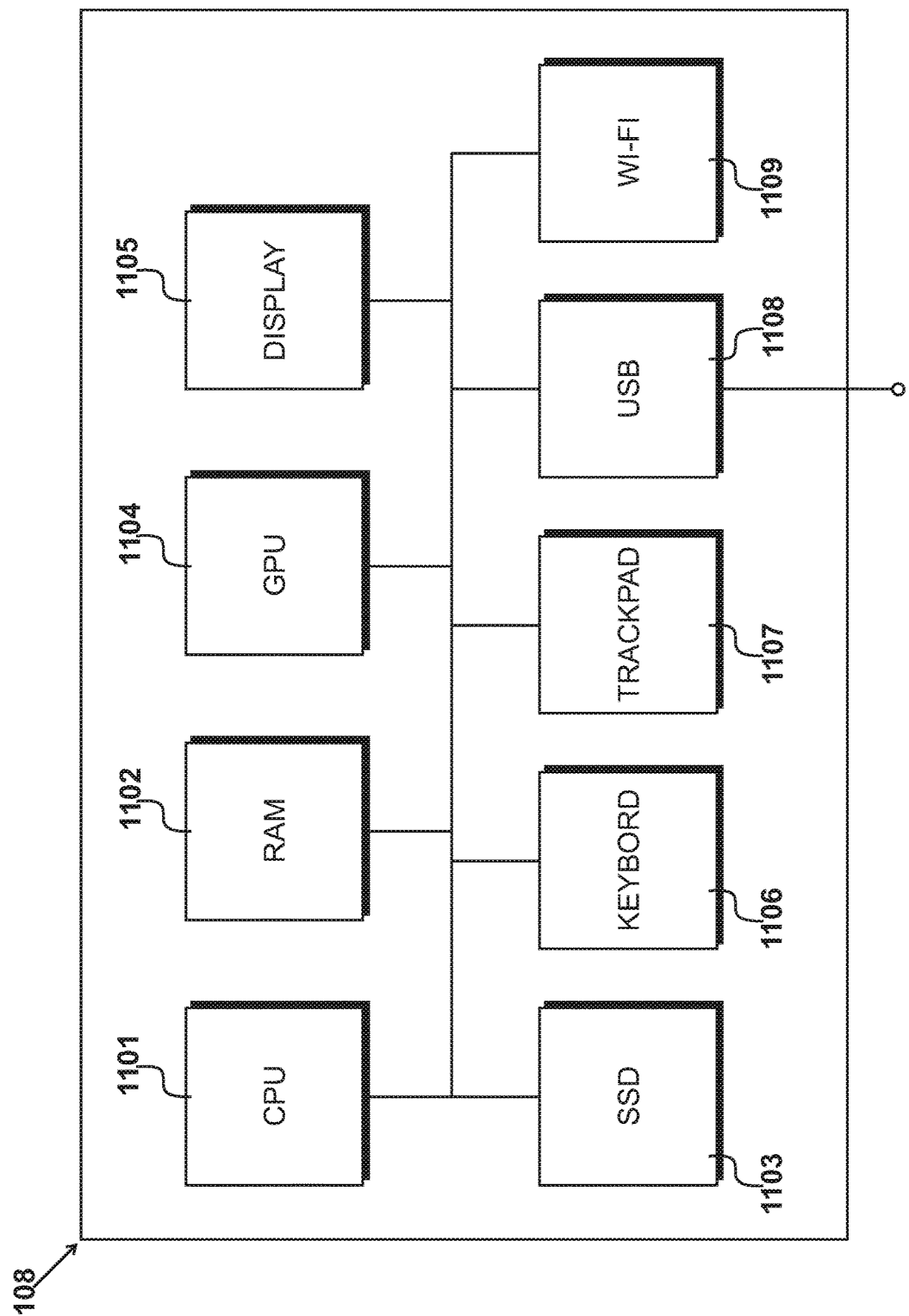
FIG. 11 is a diagram of a computer shown in FIG. 1.

We now turn to a user's computing device that is used to create or edit a virtual map. Such devices are identified in FIG. 1 as devices 108 and 109, and FIG. 11 shows an example of laptop 108. However, any computing device that has a processor, a memory, and a display device could be used.

Laptop 108 includes a processor which in this example is CPU 1101, and processor memory provided by RAM 1102. A data storage medium is provided by a SSD 1103. Graphics processing unit 1104 provides output to a display 1105, while keyboard 1106 and trackpad 1107 provide manual input. A USB interface 1108 provides input/output from USB devices, such as camera 105, while Wi-Fi interface 1109 facilitates communication with networks, such as the internet 1106. A wired interface could also be provided, such as Ethernet.

FIG. 12

Figure 12:
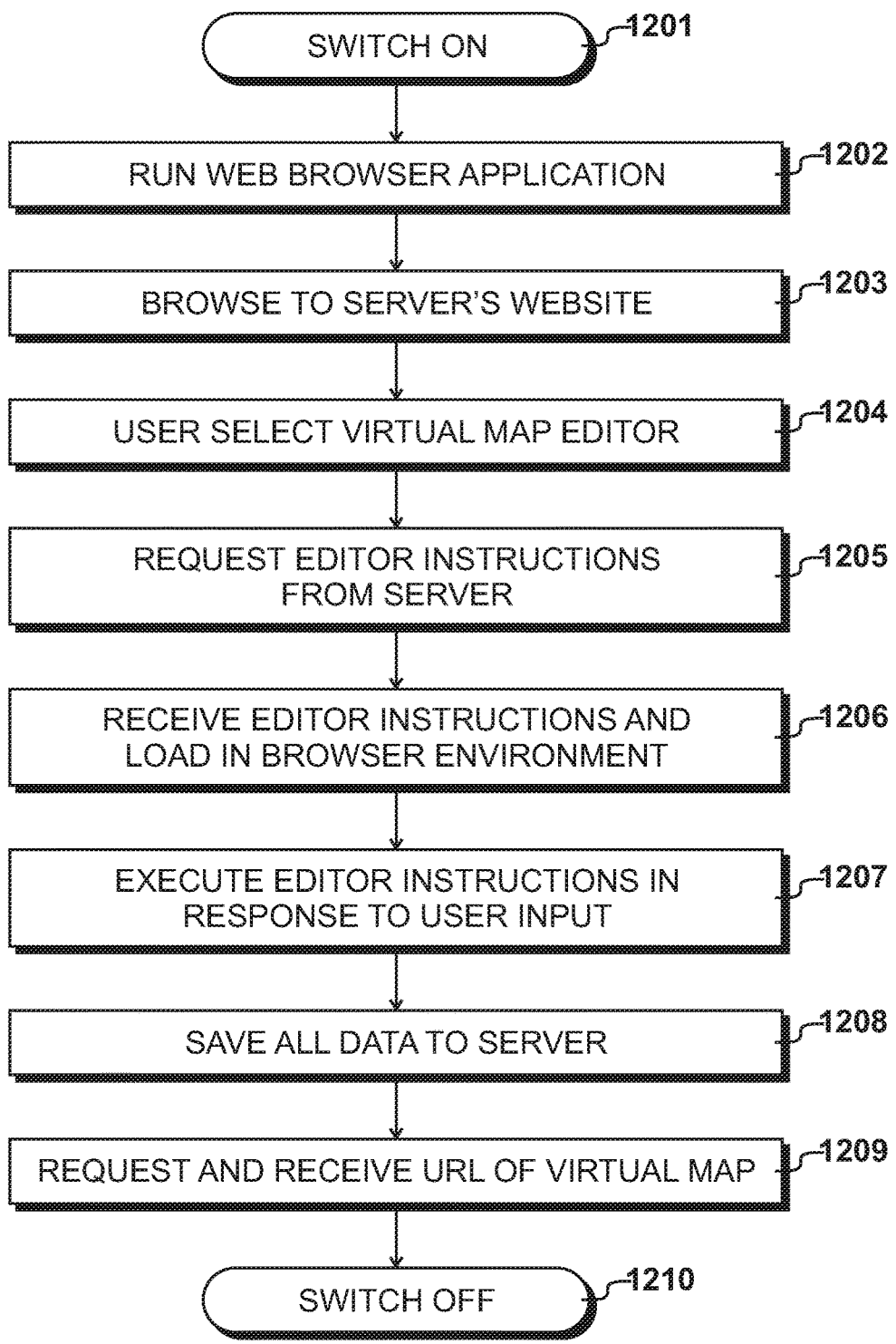
FIG. 12 shows steps carried out by a processor shown in FIG. 11 to create a virtual map.

FIG. 12 details steps carried out by processor 1101 to facilitate the creation or editing of a virtual map. At step 1201 the laptop is switched on and boots up. At step 1202 a web browser application is run, and at step 1203 it browses to the website of virtual map server 107. In this embodiment the virtual map editor is provided as an application that runs within a web browser. In other embodiments it could be a standalone application loaded onto the computing device, either via the internet 106 or from a portable storage device. However, providing the functionality using the web browser allows the virtual map editor to be used seamlessly as part of the user's browsing experience, without the user having to install an additional application.

At step 1204, while browsing the website of server 107, the user selects the virtual map editor, and at step 1205 processor 1101 sends a request for the instructions for the editor from the server, which is processed by the server at step 1004.

At step 1206 the instructions are received from the server and the processor loads them in the browser environment.

At 1207 the editor instructions are executed in response to user input received via keyboard 1106 and trackpad 1107. This will be further described with respect to FIGS. 14 to 23.

Virtual map data is regularly synchronised with server 107 during step 1207, but at step 1208 all data may be saved in response to user selection of a SAVE function.

Following user selection of a PUBLISH function, processor 1101 requests and receives a URL from server 107, which indicates the location at which the virtual map may be viewed. HTML code to embed the virtual map within a website is also supplied.

At this point the user may do further work on this or another virtual map, but for simplicity of this diagram the laptop is switched off at step 1210.

In the embodiment described herein, virtual map server 107 hosts both the facility to create a virtual map and the created maps themselves. However, in other embodiments a full application for creating a virtual map could be downloaded as an application to a computing device, and in this case creation of the map would not involve a server. Further, a virtual map could be hosted by another server, or could be viewed on the computing device that created it, or could even be served from the web server, such as web server 101, that hosts the relevant website. The cloud environment described herein is only one example of suitable network architecture that may be used.

FIG. 13

Figure 13:
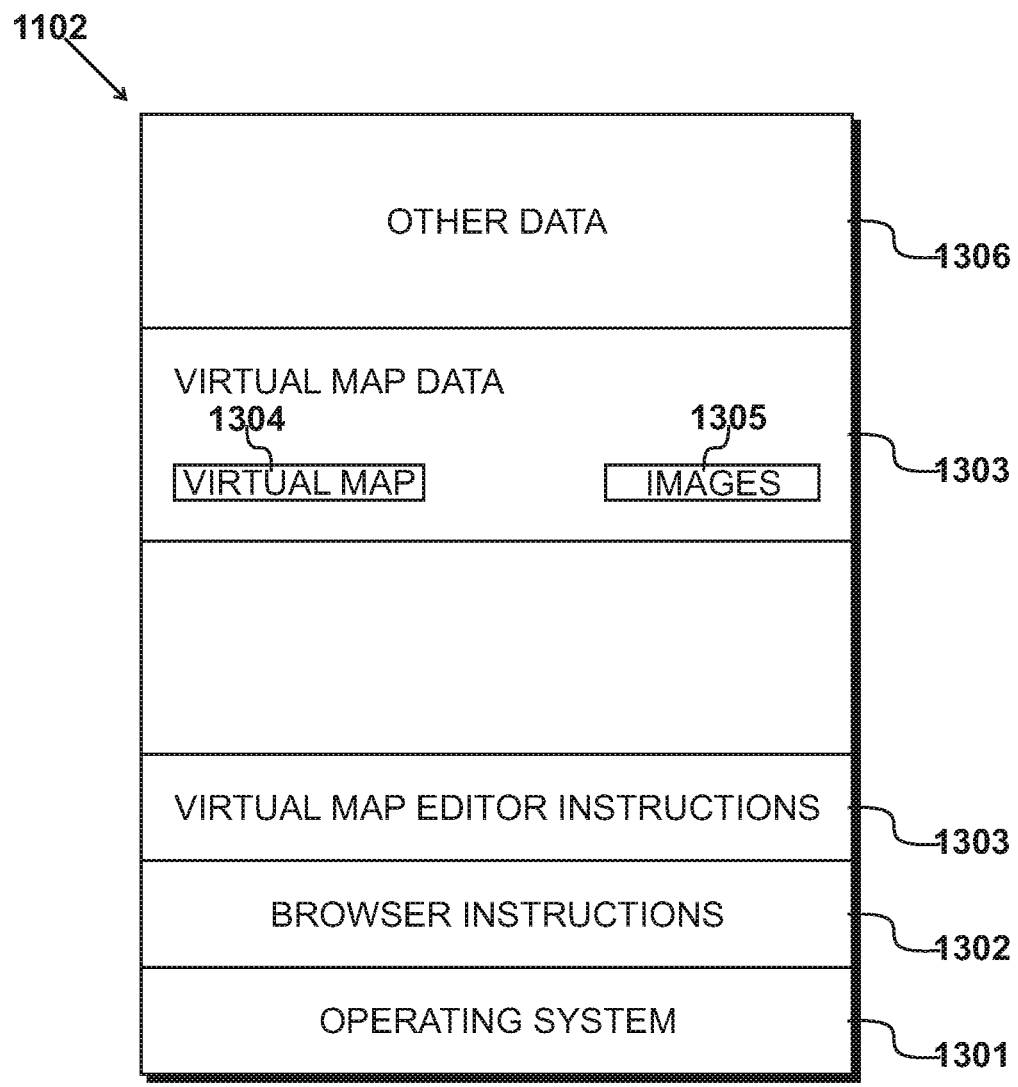
FIG. 13 shows the contents of a memory shown in FIG. 11.

FIG. 13 is a diagram of the contents of RAM 1102 while laptop 108 is executing the editing application. At level 1301 is the operating system 1301, followed by browser instructions 1302. Virtual map editor instructions 1303 are the instructions 906 supplied by server 107 to laptop 108 at step 1004, and received at step 1206. At 1303 virtual map data includes virtual map definition 1304 and images 1305. During a session, these are synchronised with virtual map definitions 911 and images 912 in RAM 705 of server 107. Other data is at 1306.

FIG. 14

Figure 14:
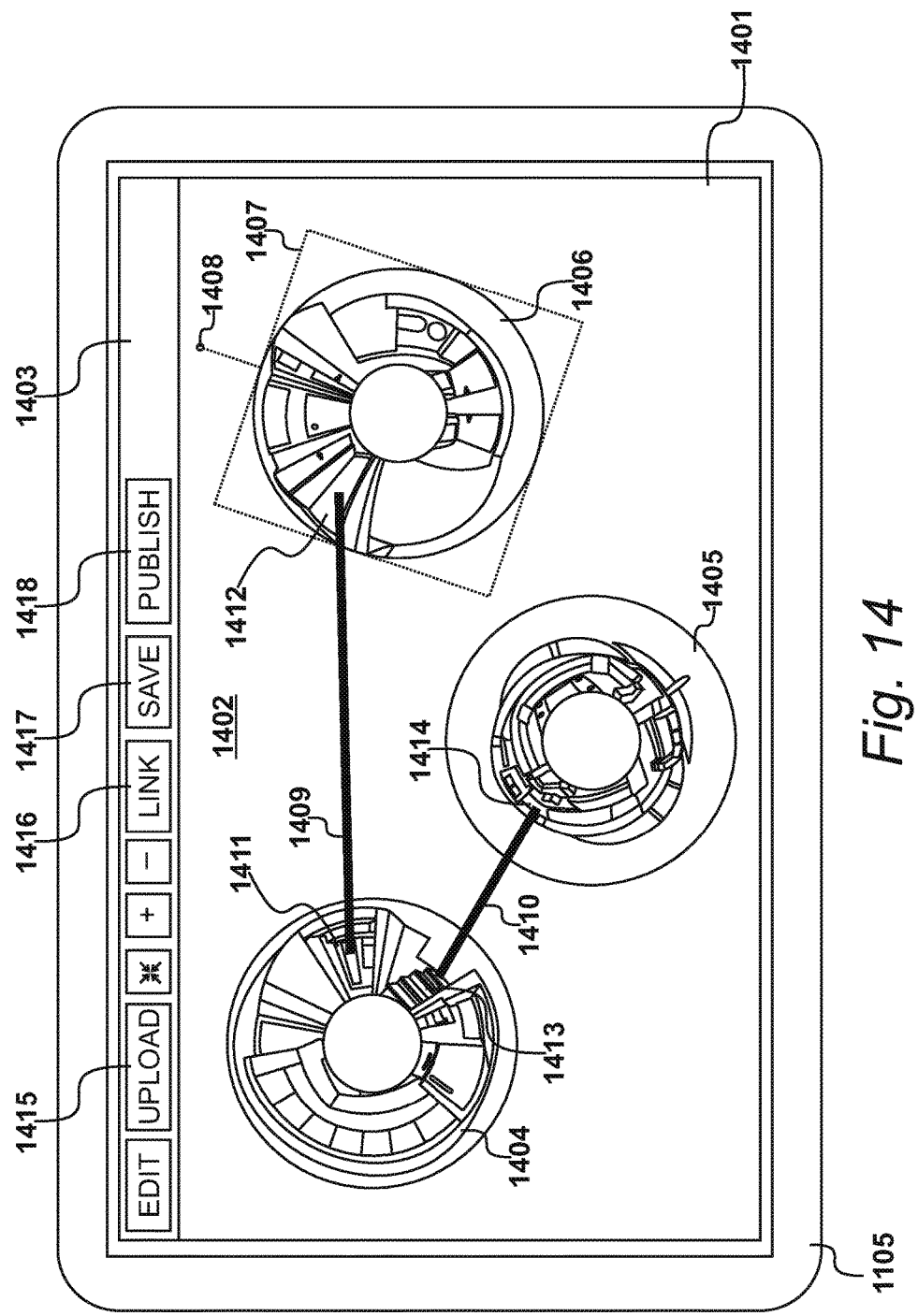
FIG. 14 illustrates an interface displayed on a display shown in FIG. 11.

FIG. 14 illustrates the interface 1401 displayed to the user of laptop 108 on display 1105, while the editing application is being used at step 1207. The interface 1401 includes an editing area 1402 and a toolbar 1403.

While creating a virtual map, the user uploads images taken by spherical camera 105, and circular projections of these are displayed within area 1402. In this example three images have been uploaded, and are displayed as projections 1404, 1405 and 1406. Projection 1406 is shown with a containing square 1407 which includes a rotation point 1408. When a projection is selected this containing square appears, enabling the user to move, size and rotate the projection in space 1402.

Projections 1404, 1405 and 1406 are joined by connecting lines 1409 and 1410. These are drawn by the user to link points in the images that connect to each other. Thus, for example, line 1409 connects door 1411 in projection 1404 to door 1412 in projection 1406: these are in fact the same door viewed from different rooms. Similarly, line 1410 joins the stairwell 1413 in projection 1404 to hatch 1414 in projection 1405, which are different views of the same linking staircase. As described with respect to FIG. 3, linking lines are drawn between any two points in different images that are different views of the same connection point. A connection point may be a doorway, a stairwell, or simply a point in space.

Toolbar 1403 contains buttons that when selected run functions within the editing application 1303. The functions triggered by upload button 1415 and link button 1416 will be described in detail with respect to FIGS. 16 and 22 respectively. Selecting the SAVE button 1417 triggers the saving of data at step 1208, and the selection of PUBLISH button 1418 triggers the publication of the virtual map at step 1209.

Interface 1401 provides the user with an intuitive way of creating links between images representing physical space. It is not even necessary for the virtual map to include every part of the space being toured. For example, if two rooms are connected by an unphotographed corridor, then images of the two rooms at either end of the corridor could still be linked, even though the rooms are not physically adjacent.

FIG. 15

Figure 15:
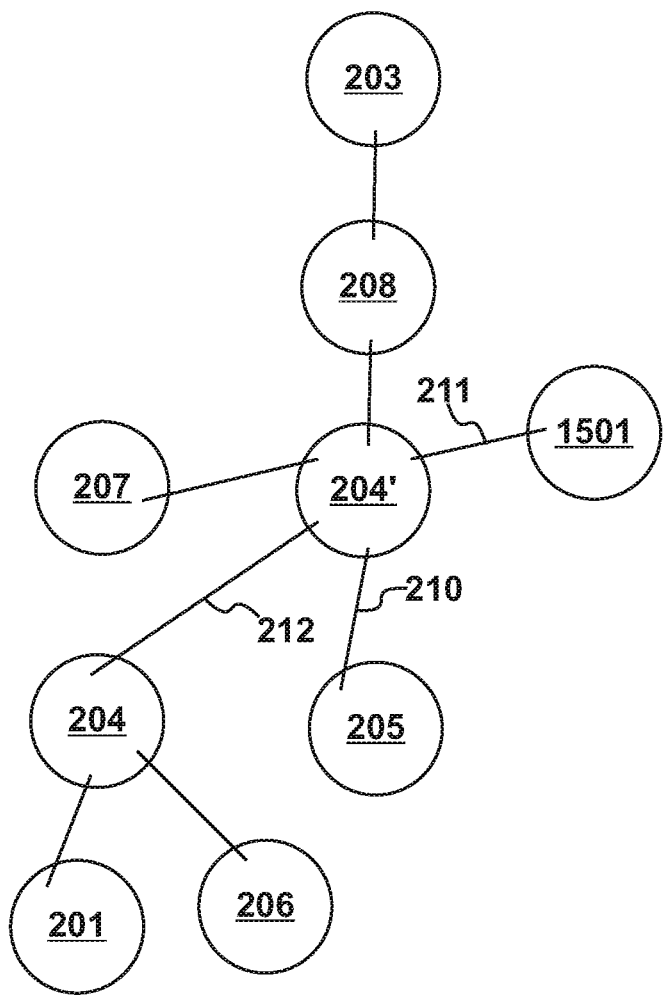
FIG. 15 is a representation of a layout of map data.

The example shown in the interface of FIG. 14 only contains three images and two linking lines. However, a typical virtual map would include many images and many connection points. FIG. 15 is a diagrammatic illustration of the layout that could result from a user creating a virtual map of the floorplan shown in FIG. 2. Each circle in FIG. 15 represents a projection of an image of the room indicated, and each line represents a connection point shown by a cross on FIG. 2. Circle 1501 represents an image of the upstairs landing. As can be seen, the user can orientate the projections so that the connection points in each are adjacent. This means that the user can, if they wish, arrange the layout of the projections to resemble the floorplan in FIG. 2, in order to assist in the creation process.

In other embodiments, the interface could display the original equirectangular images or some other projection, rather than the circular projections described herein. The user could still define connections between points in the images, and the virtual map thus produced would be indistinguishable from that produced using the interface of FIG. 14. However, use of the circular projections enables the uncluttered, intuitive layout that is possible as shown in FIG. 15.

FIG. 16

Figure 16:
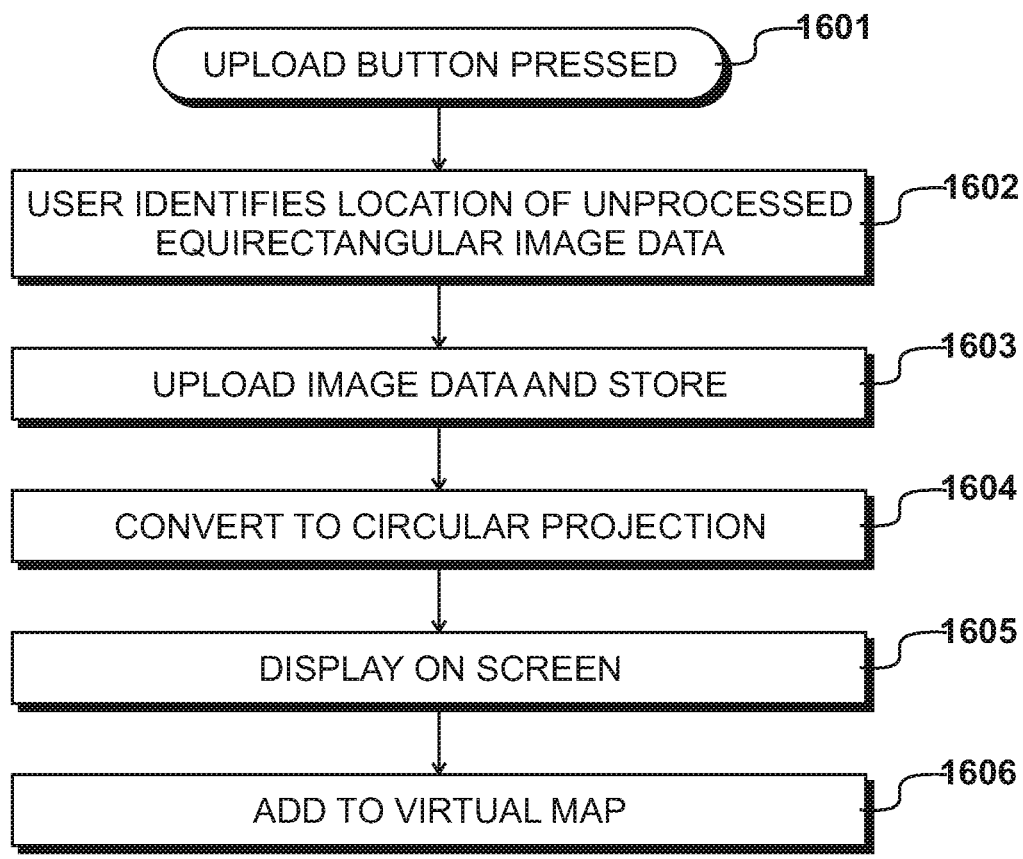
FIG. 16 details steps carried out by the processor shown in FIG. 11 to upload images.

FIG. 16 details steps carried out by processor 1101 during step 1217, when upload button 1415 is selected by the user at step 1601. At step 1602 the user is invited, via a dialog box or similar, to identify the location of the unprocessed equirectangular image data to be uploaded, and at step 1602 the image data is uploaded from the identified location and stored in RAM 1102 at image store 1305. The image may be uploaded directly from camera 105, connected via USB interface 1108, or it may have been previously stored in data storage medium 1103 or in a networked location.

Figure 18:
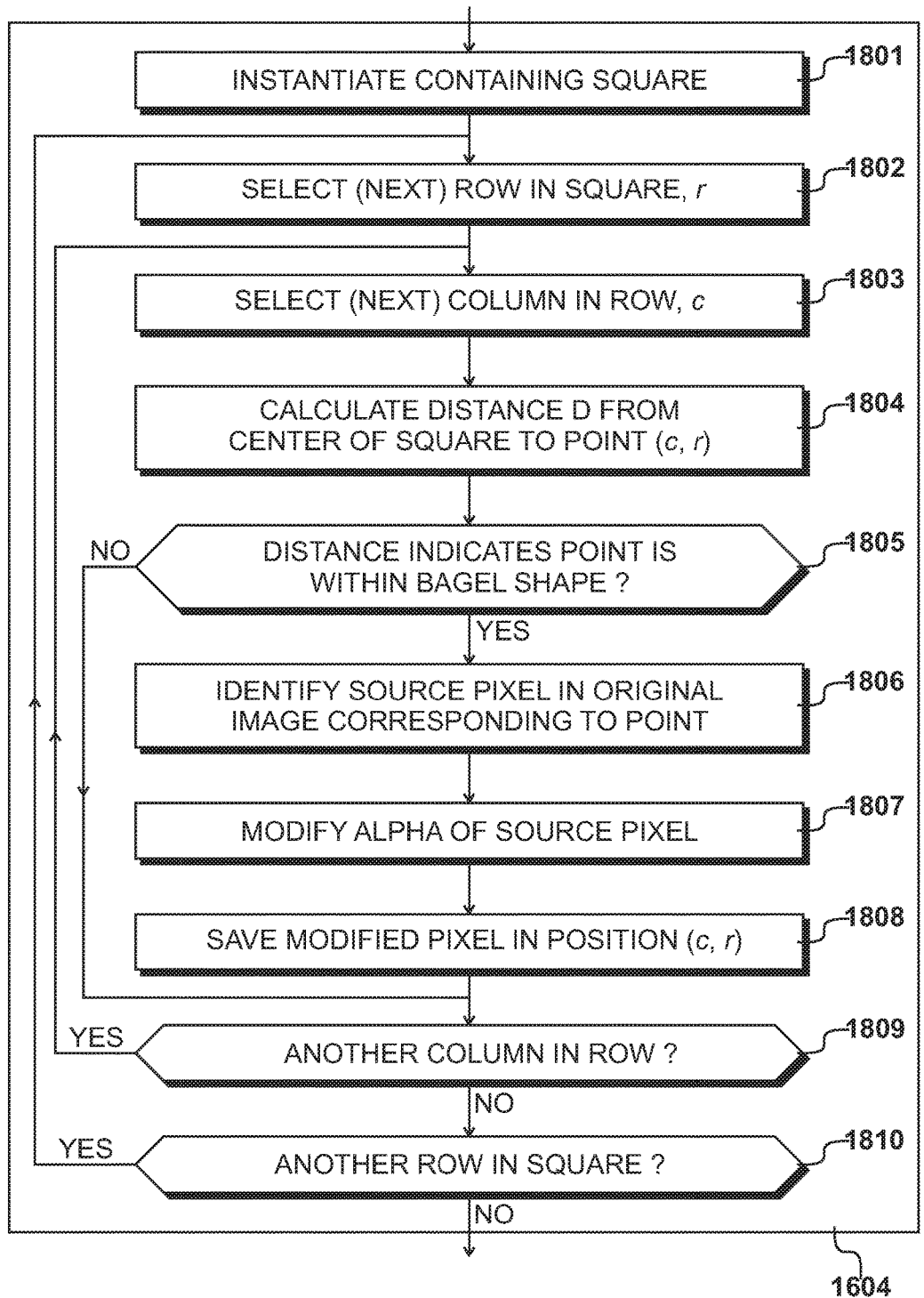
FIG. 18 details steps carried out during FIG. 16 to create the circular projection shown in FIG. 17.

At step 1604 the equirectangular image data is converted to a circular projection, which will be detailed further with respect to FIG. 18, and at step 1605 this projection is displayed within interface 1401. At step 1606 an indication that this image has been added to the map is stored in virtual map definition 1304.

If during the editing process the user decides to delete one of the projections, then the indication of the image is deleted from virtual map definition 1304, and the original image is removed from image store 1305.

FIG. 17

Figure 17:
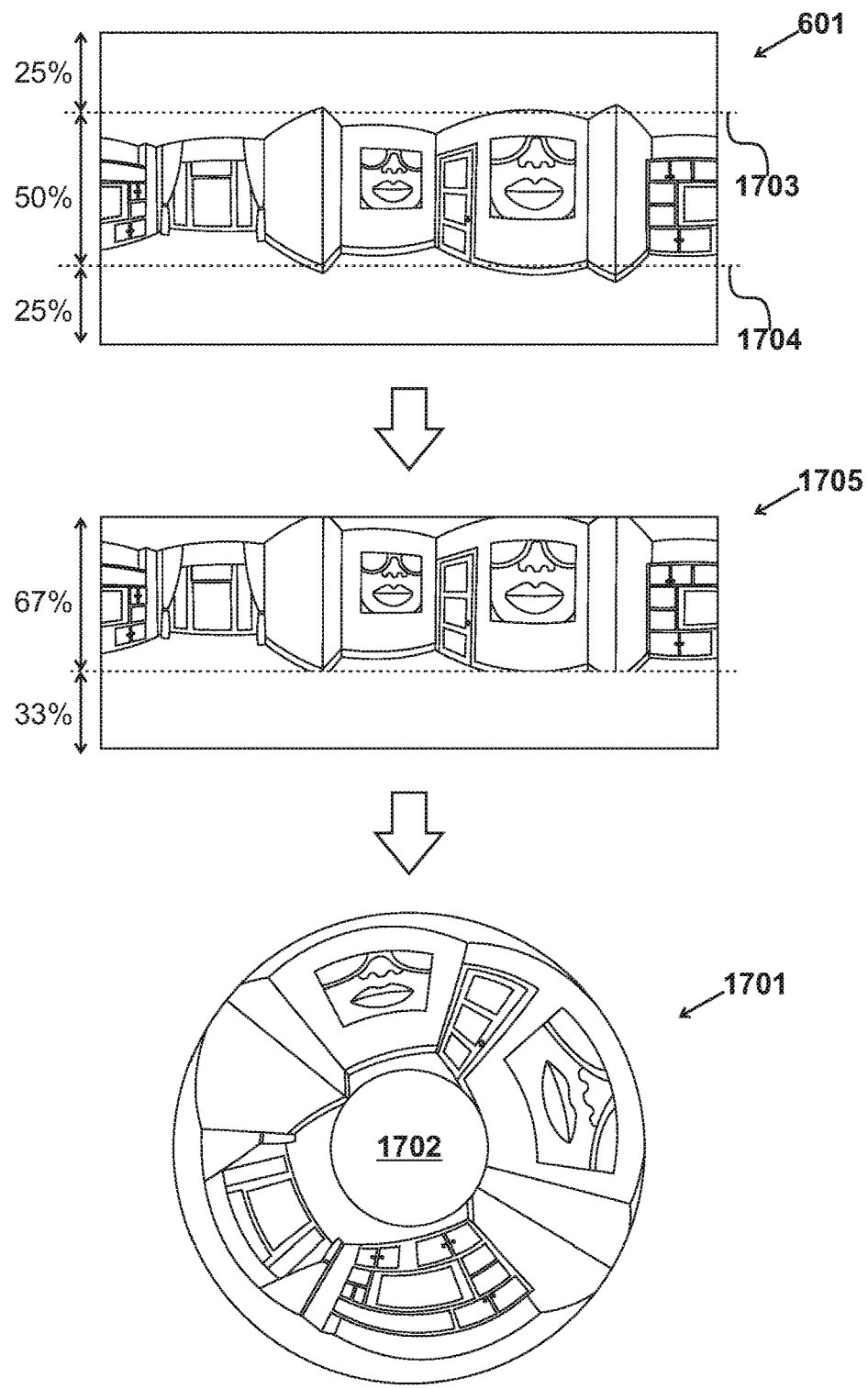
FIG. 17 illustrates the generation of a circular projection from an image.

FIG. 17 illustrates the conversion of an equirectangular image 601 to a circular projection 1701, as is detailed with respect to FIG. 18.

Image 601 includes a considerable amount of space dedicated to the floor and ceiling. Since connections are generally described between points visible at wall level, it is unnecessary to display either the floor or the ceiling in the circular projection 1701. Therefore, in the present embodiment, the ceiling is removed from the image before it is processed into a circular projection, while the floor is omitted during the process in order to leave a blank circle 1702 at the center of circular projection 1701.

The floor and the ceiling could be retained in other embodiments of the invention. However, their removal creates a circular projection that is smaller and easier to use.

Thus, returning to image 601, line 1703 indicates the cut-off for the ceiling and line 1704 indicates the cut-off for the floor. In an equirectangular projection produced by a spherical camera, both the ceiling and the floor take up approximately 25% of the height of the image each. Therefore the top 25% of the image is removed to produce image 1705. This image now has a useable area of the top 67%, while the bottom third is shown as blank, because it will not be transferred to the circular projection.

Thus circular projection 1701 is a projection of the middle half of image 601 into a bagel or doughnut shape, wrapped around a central point.

FIG. 18

FIG. 18 details step 1604 of the upload process, at which the uploaded equirectangular image, for example image 601, is converted to a circular projection, for example projection 1701. Further details of this process are given in FIGS. 19 to 21.

At step 1801 a containing square is instantiated. This square has a standard height and width of a set number of pixels. It is processed pixel by pixel from the top left, as is common in image processing, and therefore at step 1802 the first row in the square, r, is selected, and at step 1803 the first column in that row, c, is selected. This leads to the selection of a pixel point that can be considered as point (c, r). At step 1804 the distance D from the centre of the square to this point is calculated, and at step 1805 a question is asked as to whether this distance measurement indicates that the point in the square is within the bagel shape created by predetermined thresholds of the circular projection. In this embodiment, the outer circle of this bagel shape has a diameter the same as the width of the square, and the inner circle has a diameter that is one third of that of the outer circle, both circles being centred with respect to the containing square. This layout can be seen in FIG. 19.

If the question asked at step 1806 is answered in the affirmative, to the effect that this point is within the bagel shape, then at step 1806 the source pixel in the original equirectangular image that corresponds to this point is identified. At step 1807 the alpha channel of the source pixel is modified if necessary before the pixel information is saved in the position of point (c, r).

If the question asked at step 1805 is answered in the negative, to the effect that the selected point is not within the bagel shape, then steps 1806 to 1808 are skipped and this point is left blank. This creates the white space within the containing square, outside the outer circle and inside the inner circle.

A question is then asked at step 1809 as to whether there is another column in the selected row, and if this question is answered in the affirmative then control is returned to step 1803 and the next column is selected. If it is answered in the negative, to the effect that this row has been processed, then at step 1810 a question is asked as to whether there is another row of pixels in the containing square, and if this question is answered in the affirmative then control is returned to step 1802 and the next row is selected. If it is answered in the negative then every point in the containing square has been processed and step 1604 is complete.

Thus, during step 1604 each point in the containing square is considered, and it is either left blank or pixel data from the original equirectangular image is imported.

The process described herein considers the square on a pixel by pixel basis, but if lower resolution were an acceptable compromise in exchange for faster processing speed, then in other embodiments the process might, for example, average out pixel information.

The containing square thus produced is the image displayed to the user within interface 1401. When the user selects one of the circular projections, the containing square is displayed as square 1407 with a rotation point 1408.

FIG. 19

Figure 19:
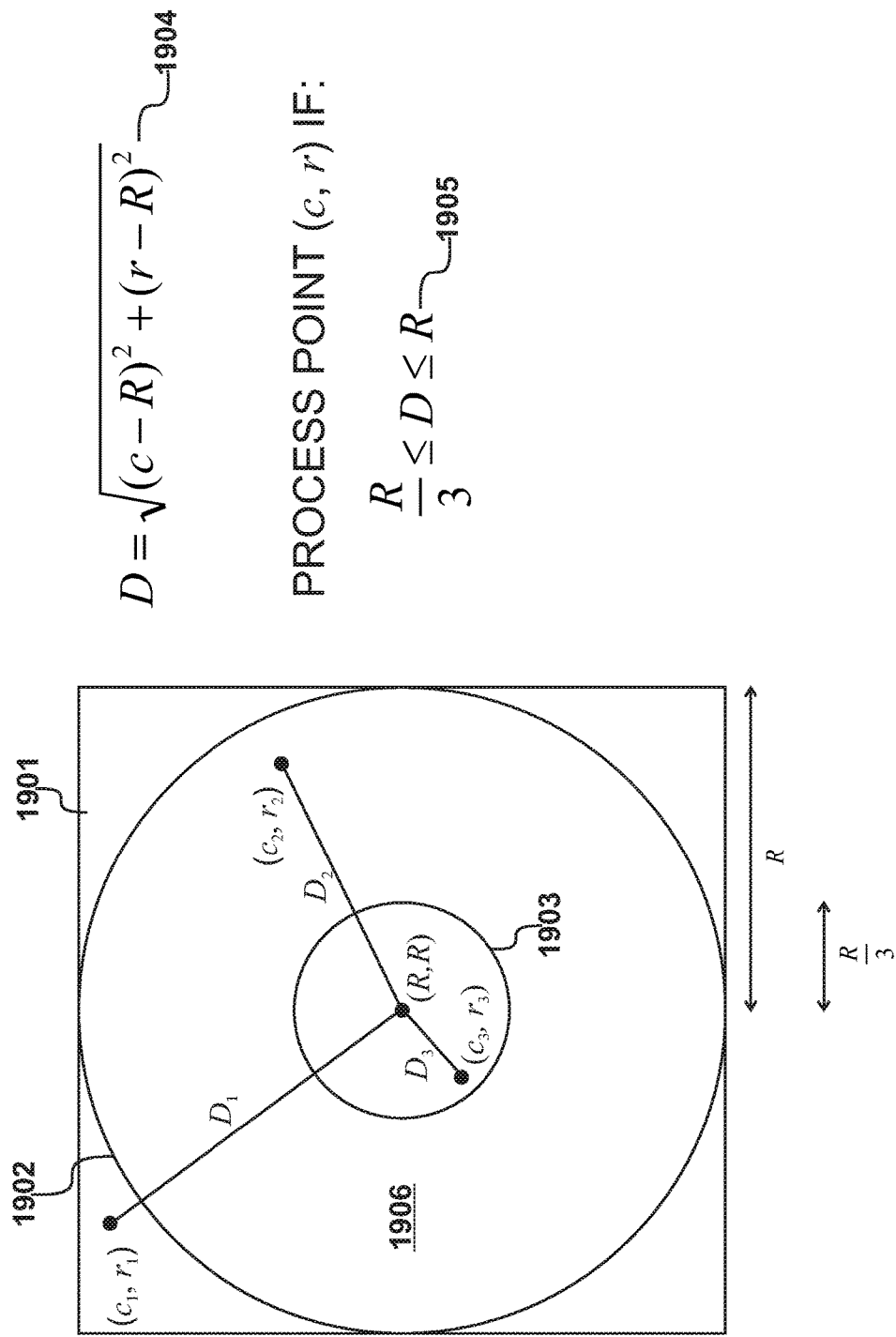
FIG. 19 illustrates calculations carried out during FIG. 18.
Figure 20:
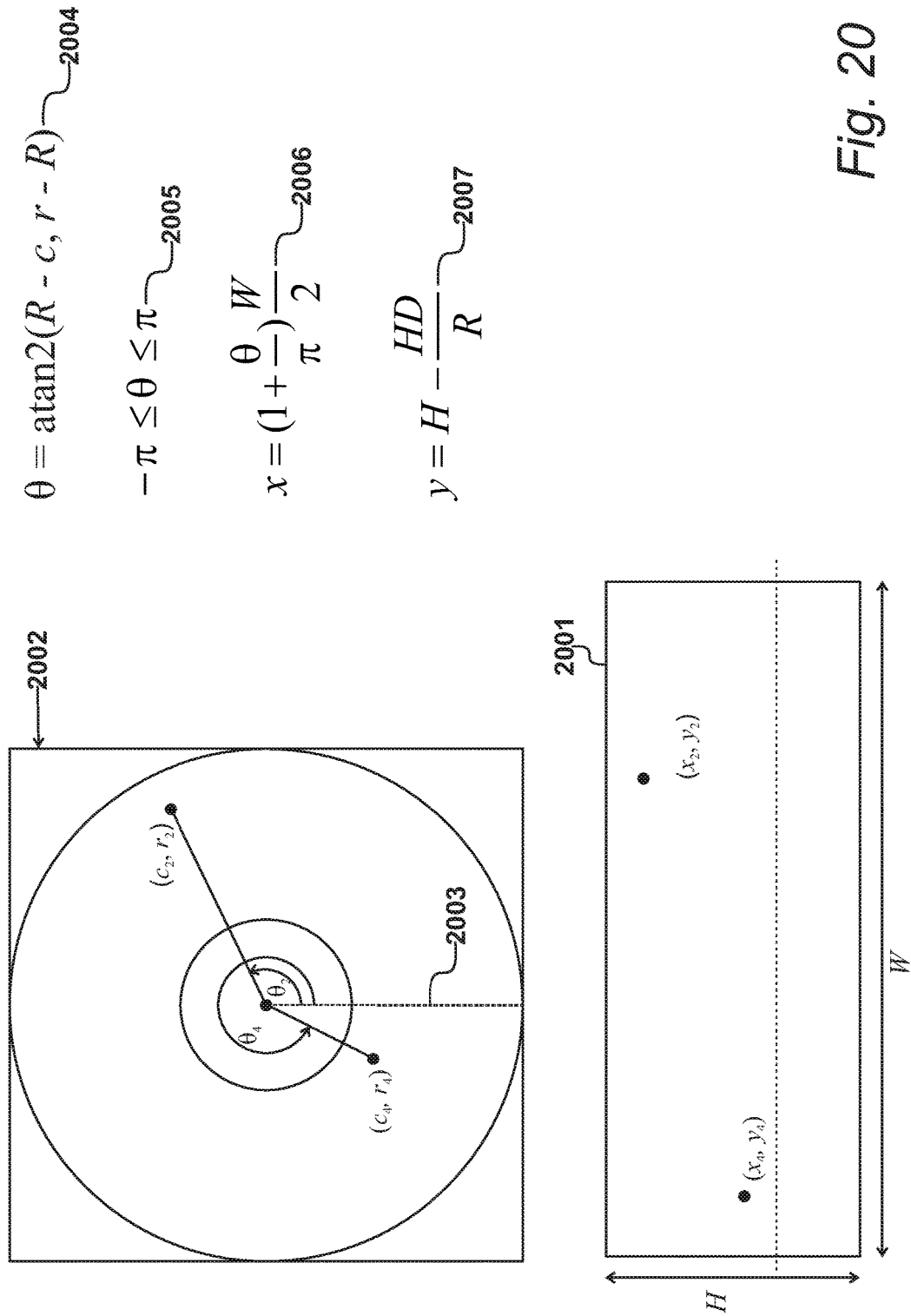
FIG. 20 illustrates further calculations carried out during FIG. 18.

FIGS. 19 and 20 give the formulae used in the steps carried out in FIG. 18.

FIG. 19 shows how the distance from the centre of a containing square 1901 to a selected point (c, r) is used to determine whether the point is filled in with pixel information from the original equirectangular image, or is left blank.

Square 1901 is instantiated with a standard width and height of 2 R, where R is a predetermined number of pixels. The outer circle 1802 has a radius of R. The inner circle 1903 has a radius of R/3; thus, referring back to FIG. 17, it can be seen that the space between the two circles 1902 and 1903 will contain the top two thirds of image 1705, whereas the inner circle, rather than continuing the lower third of the image, will be left blank.

If the top left point of square 1901 is considered to be at coordinates (0, 0), then the center point is at coordinates (R, R). The distance D between the center point and any given point (c, r) is therefore given by formula 1904:

$$D=\sqrt{(c-R)^2+(r-R)^2}$$

Thus if the distance D is less than R/3 or greater than R, as shown at 1905, the point is outside the bagel, in which case the question asked at step 1805 is answered in the negative, and the point is left blank. In the example shown in FIG. 19, the point $(c_1, r_1)$ is outside outer circle 1902 and will therefore have a value of D greater than R, meaning that it will be left blank. Point $(c_2, r_2)$ is within the bagel and therefore pixel information from the source image will be imported. Point $(c_3, r_3)$ has a value of D less than R/3, and is therefore inside inner circle 1803 and will be left blank.

The thresholds used in this method are dependent upon the removal of the lower one-third from the cropped rectangular image. If a smaller or greater amount is to be removed, then the threshold to decide whether a point inside the containing square is inside the bagel shape would be correspondingly different. In addition, this method crops the top 25% from the original image before generating the circular projection, but a method that removed it by use of a threshold, as the lower part is removed, would also work. In addition, in other embodiments the entire original image could be used to create the projection, particularly if it was the case that links between the floor and ceiling of adjacent rooms were required, for example to link an attic space by way of a roof hatch.

FIG. 20

FIG. 20 shows the formula used during step 1806 to identify the source pixel in the originating image. In this illustration, the original equirectangular image is shown at 2001 while the circular projection created from it is shown at 2002. In order to determine a position within source image 2001, a point (c, r) in the containing square must be converted to a point (x, y) in the source image 2001. This source image has already had the top 25% removed, and therefore corresponds to image 1705. Using the image processing convention that the point (0, 0) is at the top left, the x coordinate therefore varies from 0 to W, where W is the width of the data in pixels, and the y coordinate varies from H at the bottom to 0 at the top of the image, where H is the height of the image in pixels after the top 25% has been removed. Thus, any point with a y coordinate larger than 2H/3 will fall within the inner circle and will not be displayed.

In order to determine an x coordinate, the angular position of the point (c, r) around the center point (R, R) is determined using formula 2004:

$$\theta = a\tan 2(R-c, r-R)$$

The function a tan 2 (which is well known and will not be set out herein) is a discontinuous function that returns a value between $-\pi$ and $\pi$, as shown at 2005. This value corresponds to the angular distance, taken in an anti-clockwise direction, between the line 2003 and the point (c, r). Thus, looking at the example of 2002, point $(c_2, r_2)$ returns a value of $\theta$ that is smaller than the value returned by point $(c_4, r_4)$.

Line 2003 represents the join between the two edges of image 2001 when it is projected. Therefore, the formula to convert the variable θ into an x coordinate in image data 2001 is given by formula 2006:

$$x = \left(1 + \frac{\theta}{\pi}\right)\frac{W}{2}$$

The previously calculated distance D from the point (c, r) to the center of the circle is used to identify the corresponding y coordinate in image 2001 using formula 2007:

$$y = H - \frac{HD}{R}$$

Thus, for example, the point $(c_2, r_2)$ in projection 2002 corresponds to the point $(x_2, y_2)$ in image 2001, and the pixel data from that point is imported to point $(c_2, r_2)$. Similarly, the pixel information from point $(x_4, y_4)$ is imported to point $(c_4, r_4)$ in projection 2002.

The pixel information imported is the RGB and alpha (opacity) values for the selected pixel. The alpha value may be modified before importing, as will be described further with reference to FIG. 21.

Other embodiments may use other methods of creating a circular projection from an equirectangular image.

FIG. 21

Figure 21:
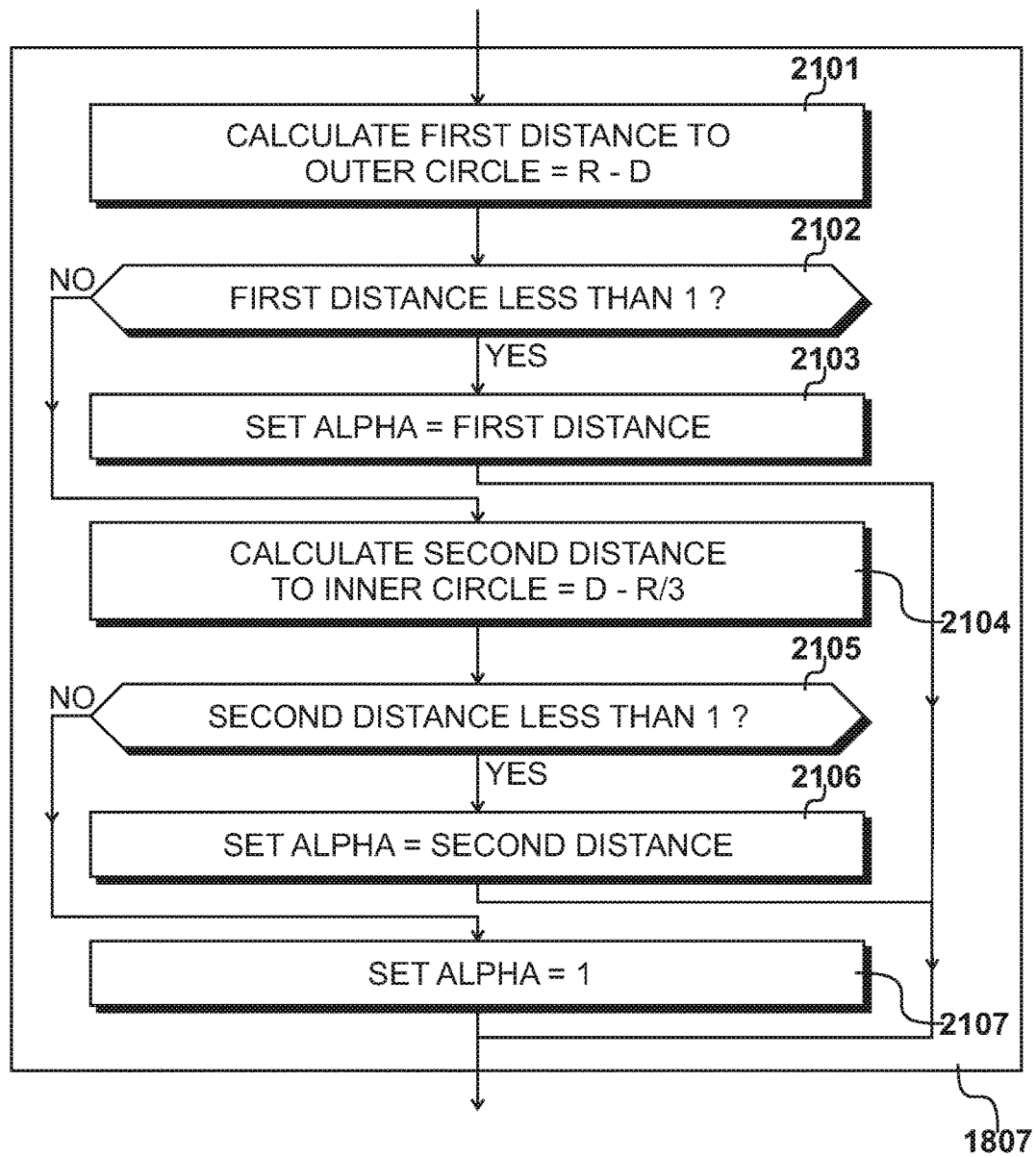
FIG. 21 details steps carried out during FIG. 18 to modify the alpha channel.

FIG. 21 details step 1807 at which the alpha channel of the source pixel is modified if it is close to the outer or the inner edge of the bagel shape. The value of alpha for all the pixels in the source image is assumed to be 1.

At step 2101 a first distance is calculated to be the distance from the outer circle to the point under consideration. In this embodiment, this first distance is calculated as R−D. At step 2102 a question is asked as to whether this first distance is less than 1, and if this question is answered in the affirmative then at step 2103 the value for the alpha channel when the source pixel is copied is set to be this first distance.

If the question asked at step 2103 is answered in the negative, to the effect that the first distance is greater than 1, then at step 2104 a second distance is calculated, which is the distance from the point under consideration to the circumference of the inner circle. In this embodiment, this is calculated as D−R/3. At step 2105 a question is asked as to whether this second distance is less than 1, and if this question is answered in the affirmative then at step 2106 the value for the alpha channel when the source pixel is copied is set to be this second distance.

However, if the question asked at step 2105 is also answered in the negative then at step 2107 the alpha is left unaltered at 1. In other embodiments, if the alpha channel of all pixels in the source image was not 1, then at this step the alpha could either be set to 1 or be left unaltered.

These steps have the effect of reducing the alpha, and therefore the opacity, of the pixels at the very edges of the bagel shape. This reduces the appearance of jagged lines and corners that would otherwise be present. In other embodiments, the formulae for calculating the first and second distances could be different, leading to a wider band of reduced alpha at each edge.

Thus at the conclusion of the steps detailed in FIG. 18, a circular projection of the original equirectangular image data has been generated and displayed on display 1105. The user can now easily create links between these projections in order to define connections between the spaces photographed in the original images.

FIG. 22

Figure 22:
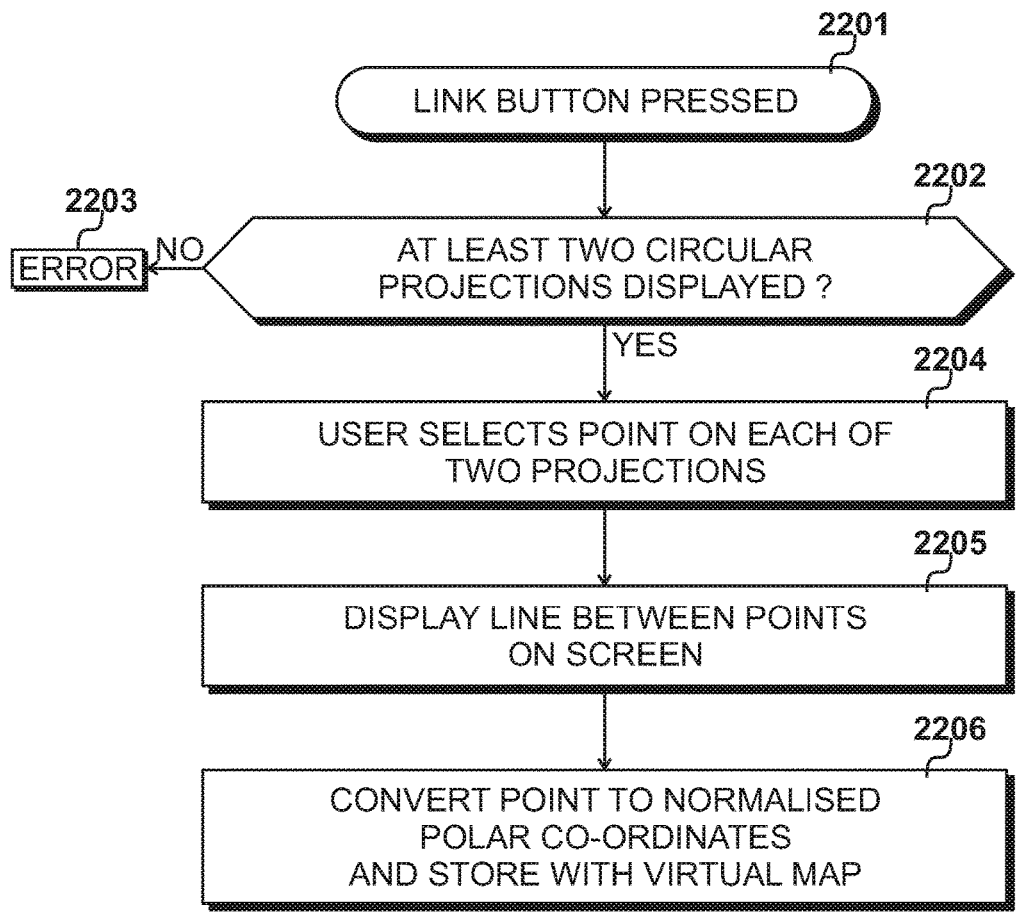
FIG. 22 details steps carried out by the processor shown in FIG. 11 to link images.

FIG. 22 details steps carried out by processor 1101 while executing editor instructions 1303, following a user selection of link button 1416 at step 2201.

At step 2202 a question is asked as to whether at least two circular projections are displayed, and if this question is answered in the negative then an error message is displayed at step 2203 and the process is terminated. In this embodiment, it is not possible to create a link from a projection to itself.

However, if the question is answered in the affirmative then at step 2204 the user selects a point on each of two projections, and at step 2205 a line is displayed between these two points on the display, thus indicating to the user that the link has been created. At step 2206 the selected points are converted to normalised polar coordinates and stored in virtual map definition 1304.

The polar coordinates stored are with reference to the circular projection. However, they are easily transformed into pitch and yaw values that can be used with reference to the equirectangular images in image store 1305, as will be described further with respect to FIG. 27.

FIG. 23

Figure 23:
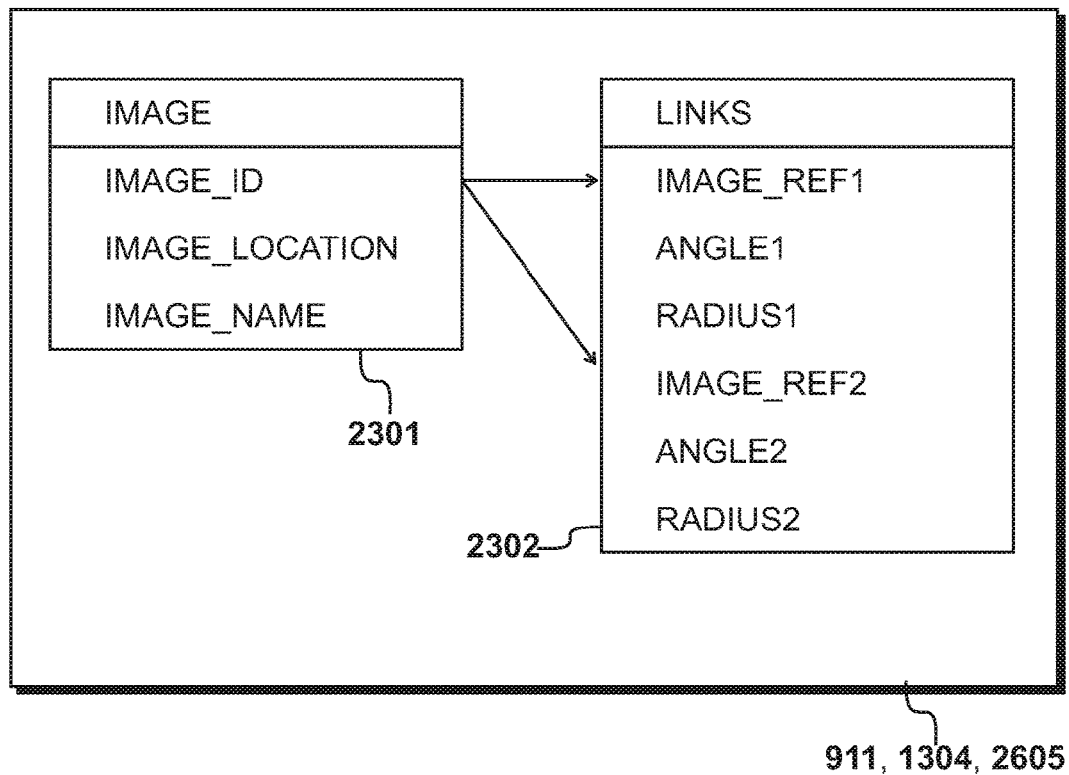
FIG. 23 illustrates a database structure that stores a virtual map definition.

FIG. 23 shows a database structure suitable for storing the virtual map data. This is the virtual map definition stored at 911 on server 107, at 1304 on laptop 108, and at 2605 on tablet 103 (see FIG. 26).

The database contains two tables. The first, images table 2301, contains a list of images contained in the map, their locations within the image store 912, 1305 or 2606, and their alphanumeric names. The second, links table 2302, contains in each record references to two images from table 2301. For each image, polar co-ordinates are given as an angle and a radius.

Thus each line in table 2302 defines a link between a point in each of two different images. Each link is displayed as a connection point in the virtual map viewer.

Within virtual map definitions 911 in server memory 705, a plurality of database structures such as this are stored, one for each virtual map. However, each requesting device only holds one such structure in memory, for the map currently being edited or viewed.

The structure shown in FIG. 23 is an example of position data, that stores identifications of positions within images, and an indication that at least one pair of such positions is connected. The position data could take other forms in other embodiments.

FIG. 24

The process of a customer viewing a virtual map will now be briefly described with reference to FIGS. 24 to 27.

Figure 24:
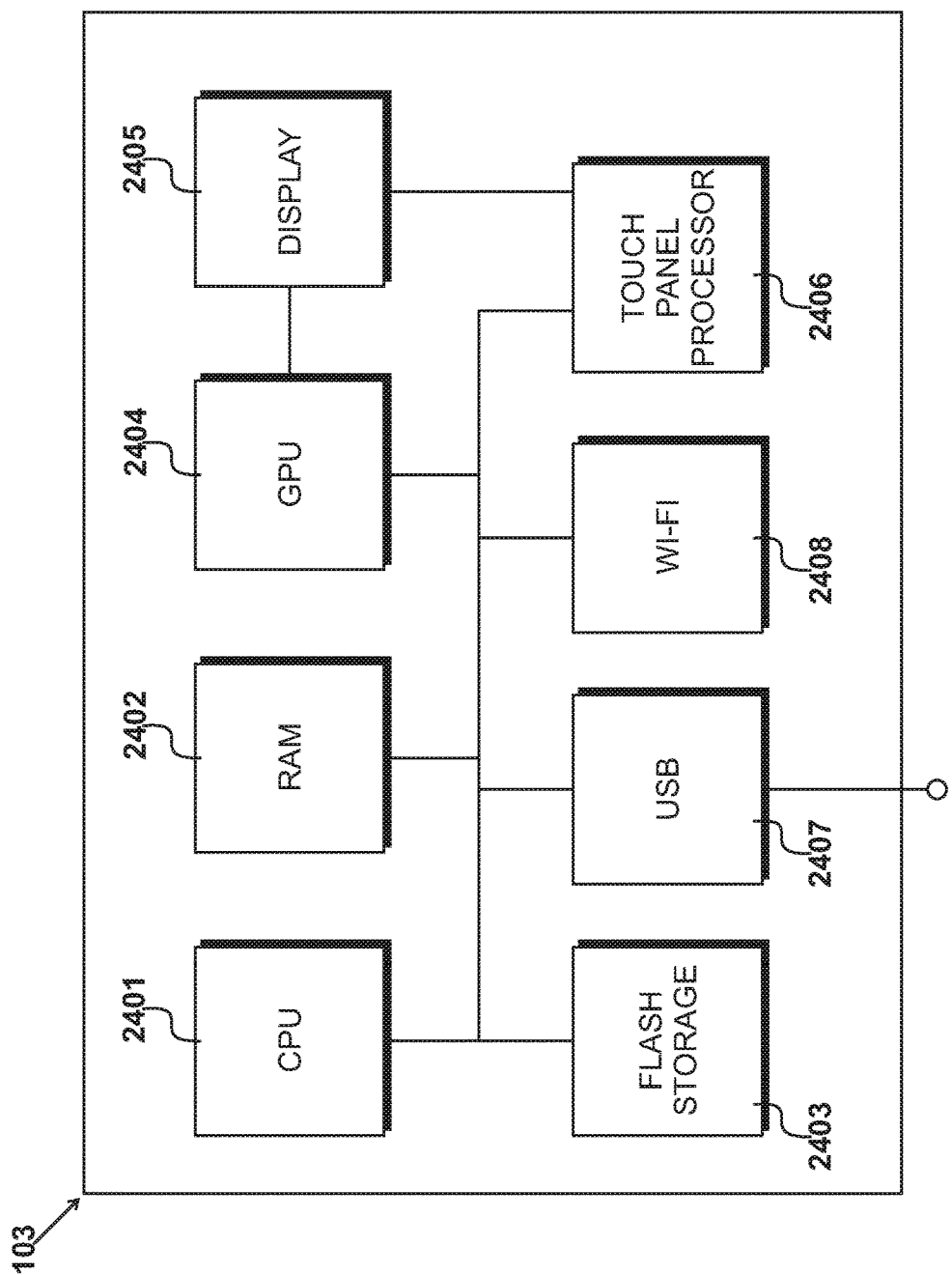
FIG. 24 is a diagram of a tablet computer shown in FIG. 1.

FIG. 24 is a diagrammatic representation of tablet 103 that is in this example used to view a virtual map. However, as previously indicated, any computing device with a processor, memory and a display can be used. The processor in tablet 103 is provided by CPU 2401, and processor memory by RAM 2402. A data storage medium is provided by a flash drive 2403. The tablet further includes a graphics processing unit 2404 which outputs to a display 2405. A touch panel processor 2406 receives input from display 2405. Interfaces are provided by USB interface 2407 and Wi-Fi interface 2408.

FIG. 25

Figure 25:
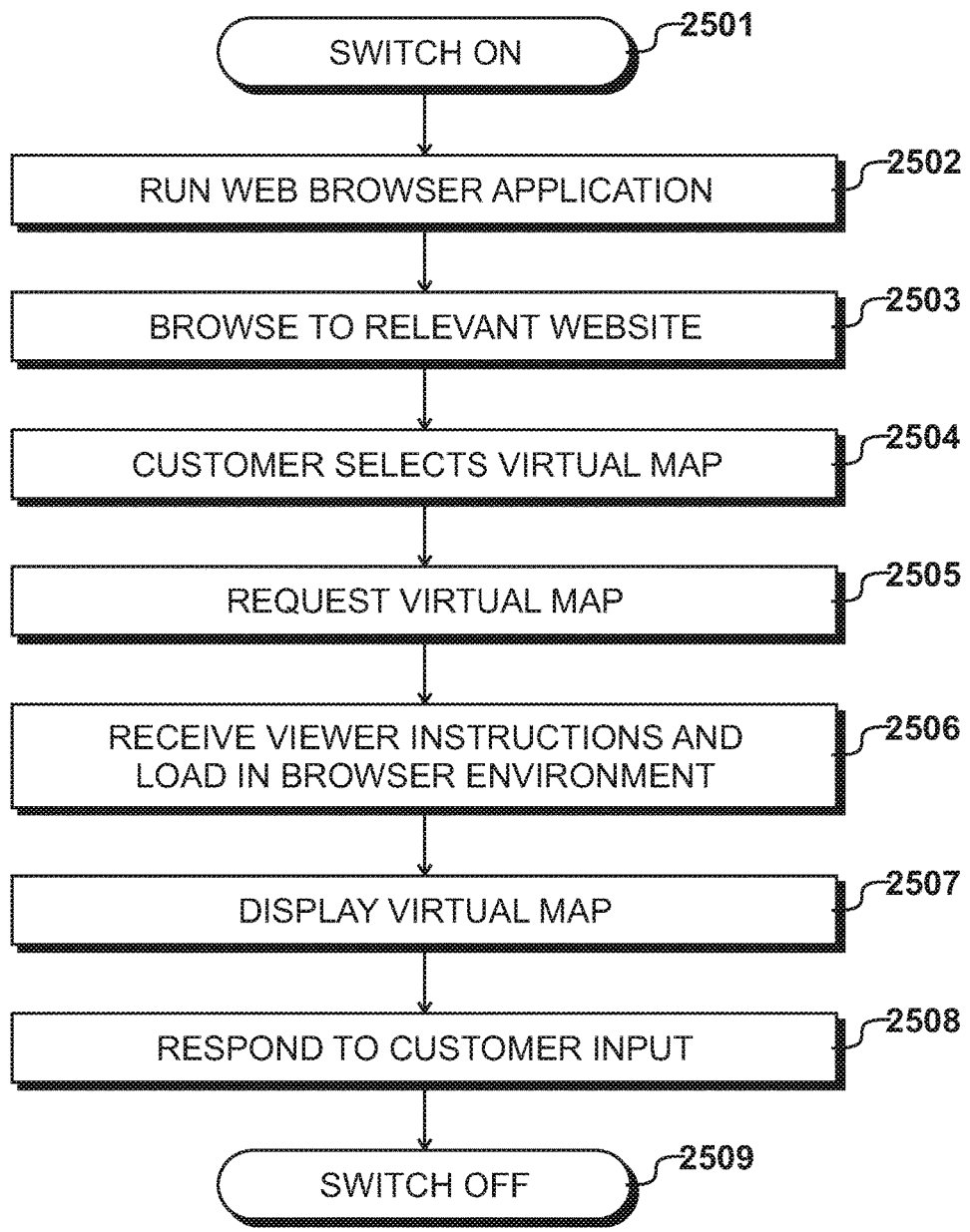
FIG. 25 shows steps carried out by a processor shown in FIG. 24 to view a virtual map.

FIG. 25 details steps carried out by processor 2401 in order to allow a customer to view a virtual map. At step 2501 tablet 103 is switched on and at step 2502 a web browser application is run. Similarly to the editing application, the viewing application is run within a browser. This enables a customer to view a virtual map without downloading a specific application to their computing device. However, in other embodiments a specific application could be used.

At step 2503 the customer browses to a website that includes an embedded virtual map, and at step 2504 the user selects a virtual map to be viewed. This provides the browser application with a URL from which the virtual map may be loaded. This URL is located on virtual map server 107; however, as previously described, the virtual map could be hosted in any location.

When the processor requests the virtual map from map server 107, the server processes this request at step 1008 and transmits instructions 909 for the client-side viewer application. These are received at processor 2401, stored in memory, and loaded within the browser environment at step 2506.

The server then provides the virtual map at step 1009. At step 2507 the virtual map is displayed within the browser, and at step 2508 the application responds to customer input to navigate the map.

When the user has finished, at step 2509 the tablet is switched off.

FIG. 26

Figure 26:
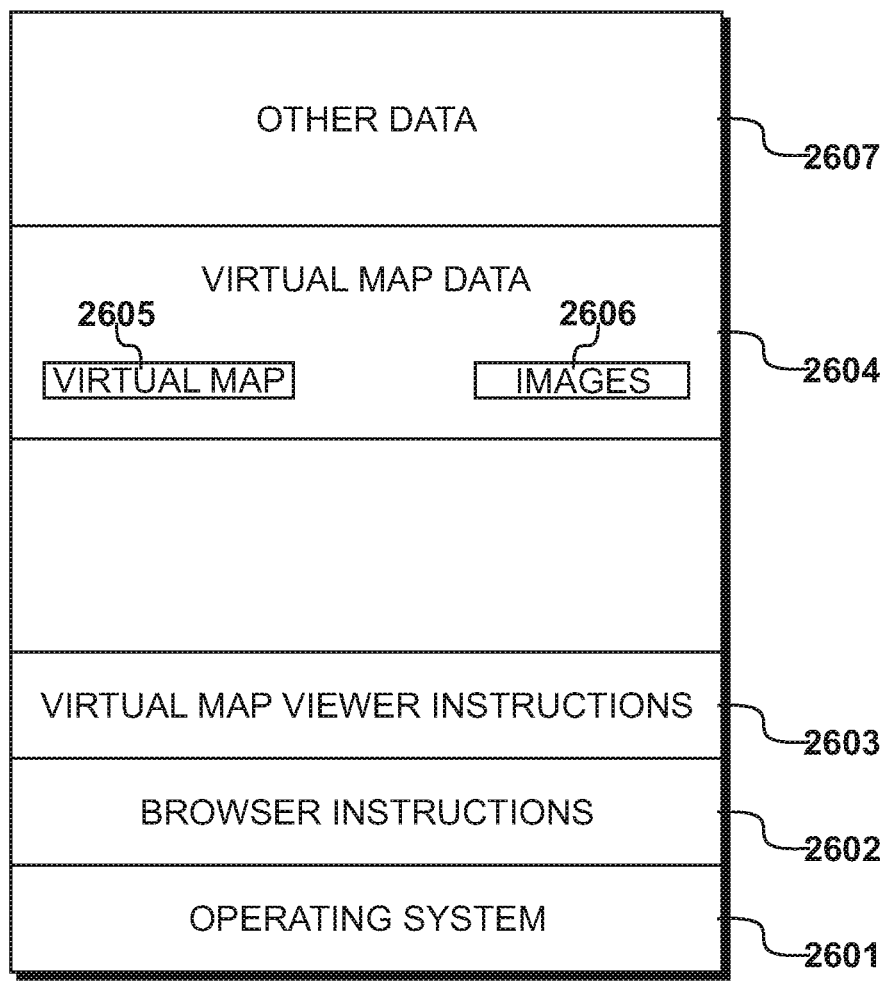
FIG. 26 shows the contents of a memory shown in FIG. 24.

FIG. 26 shows the contents of memory 2402 while processor 2401 is running the virtual map viewing application at steps 2506 and 2507.

At level 2601 is the operating system 2601, along with browser instructions 2602. At 2603 are virtual map viewer instructions. These are the instructions received from virtual map server 107 at step 2506. Virtual map data 2604 includes the virtual map definition 2605 and images 2606 received from server 107, and other data 2607 facilitates the operation of tablet 103.

FIG. 27

Figure 27:
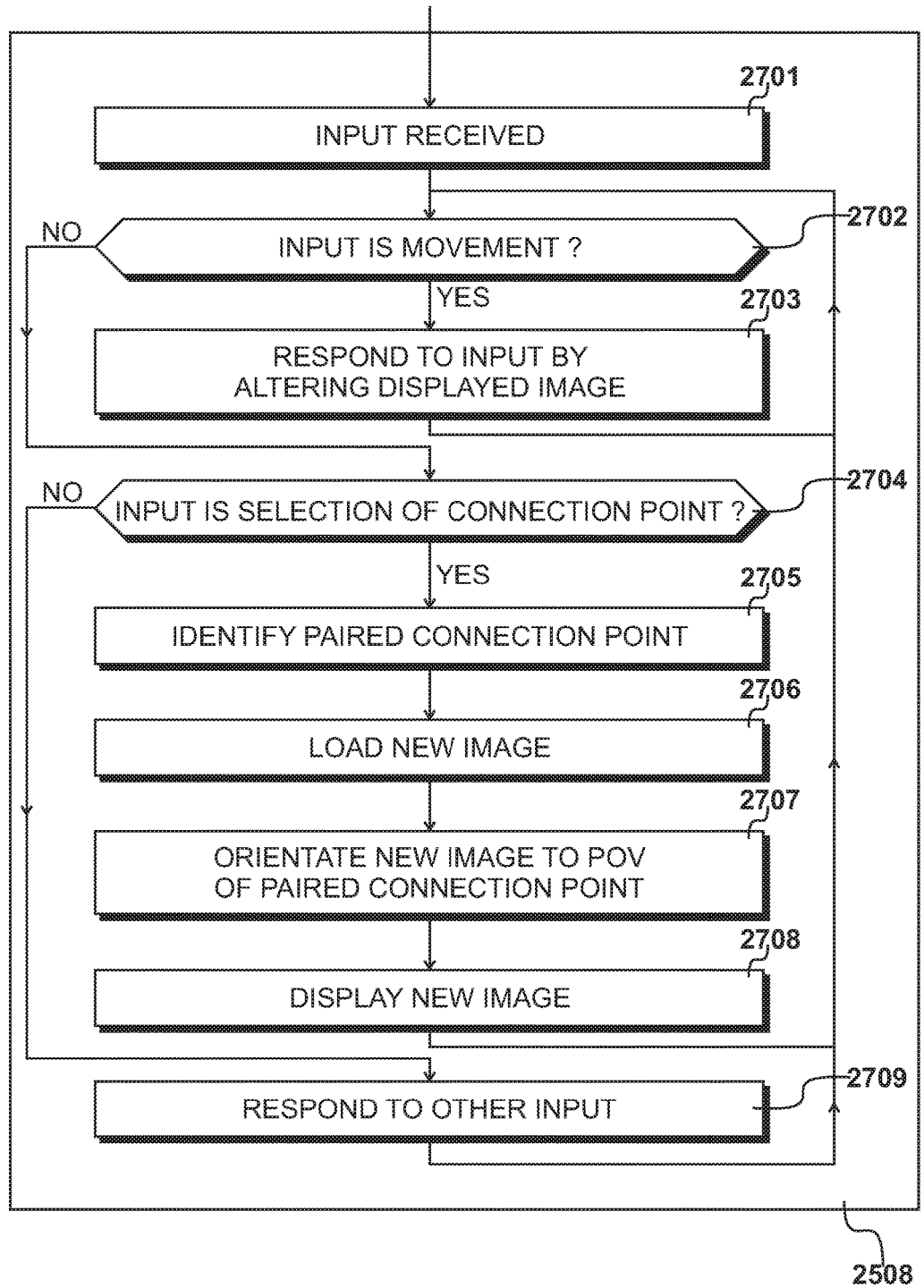
FIG. 27 details steps carried out during FIG. 25 to respond to customer input on a virtual map.

FIG. 27 details step 2508, at which processor 2401 responds to customer input while displaying the virtual map using viewer instructions 2603.

In this embodiment, viewer instructions 2603 are provided in HTML5, allowing them to be run transparently in a web browser application. Other platforms could be the widely available Flash viewer or JavaScript, but any suitable platform may be used.

The viewer loads a selected equirectangular image and displays it within a browser in a panoramic or spherical format that can be easily navigated by the customer. In addition, the viewer interrogates virtual map definition 2605 to determine whether the image contains any connection points that should be displayed. If so, the position of the connection point is obtained along with the name of the image that it leads to, and these are displayed within the image at the correct point. Points within a panoramic viewer are usually described in terms of pitch and yaw, and the polar co-ordinates stored in map definition 2605 can be easily converted as follows:

$$\text{pitch} = -90 + 135 * \text{radius}$$

$$\text{yaw} = 350 * \text{angle}$$

Thus a display projection of the image is rendered, which includes a display element, which in this example is a connection point. This display element corresponds to a position from the position data held in links table 2302.

After displaying the first image at step 2507, customer input is received at step 2701. This may be received via any suitable method of providing input, such as a touchscreen or touch pad, mouse or keyboard input, selection of an on-screen button, tilting a mobile device, etc. In this example, the customer uses the touchscreen of tablet 103 to provide input.

At step 2702 a question is asked as to whether the input is a request for movement of the image, and if this question is answered in the affirmative then at step 2703 the request is responded to by altering the view of the displayed image at step 2703.

However, if this question is answered in the negative, then at step 2704 a further question is asked as to whether the input is a selection of a connection point, which in this embodiment is displayed as a labelled target, for example as shown in FIG. 3.

If this question is answered in the affirmative then at step 2705 virtual map definition 2605 is interrogated to identify the corresponding connection point that is linked with the selected connection point. Referring back to FIG. 23, this identifies a further image file and polar coordinates within that file. Thus at 2706 the identified image is loaded, and at step 2707 the image is orientated such that it is from the point of view of the corresponding connection point. This means that the point in the displayed panoramic image that is 180° from the connection point is substantially in the middle of the field of view as displayed in the viewer. Thus the connection point is "behind" the viewer in the displayed panoramic image, and the customer would need to turn the image by exactly 180° to bring the connection point to the centre of the field of view.

At step 2708 the orientated image is displayed. Thus, the customer has the virtual experience of walking through the connection point with no change of orientation.

Thus a display projection of the next image is rendered, which also includes a display element. This display element corresponds to a position from the position data held in links table 2302.

If the question asked at step 2704 is answered in the negative, than at step 2709 other input is responded to. This could be, for example, a request to change or zoom the view, to enter a virtual reality mode where a split screen is displayed suitable for a virtual reality viewer, to display a floorplan, to enter or exit full screen mode, and so on.

The invention claimed is:

1. A method of generating and displaying a virtual map, comprising the steps of, at a processor:
   obtaining a first image and a second image, each of said images representing a physical space;
   generating a first circular projection of said first image and a second circular projection of second image, wherein each circular projection is generated from its corresponding image by:
   identifying a circle of a predetermined size, identifying a radial line within said circle, and for at least one point within said circle:
   calculating the angle between said radial line and said point and using said angle to identify a horizontal position within said image,
   calculating the distance from the centre of said circle to said point, and using said distance to identify a vertical position within said corresponding image, and
   extracting pixel information from said corresponding image at the identified horizontal and vertical positions, and inserting said pixel information at said point in the circle;
   outputting said first and second circular projections for display;
   receiving an indication of a first position in said first circular projection, and a second position in said second circular projection;
   storing position data, said position data including an identification of said first and second positions and an indication that said positions are connected;
   rendering a first display projection of said first image, which includes a first display element within said first display projection corresponding to said first position;
   rendering a second display projection of said second image, which includes a second display element within said second display projection corresponding to said second position; and
   outputting for display the virtual map comprising said first and second display projections, such that when said first display projection is being displayed and manual input is received selecting said first display element, said second display projection is automatically displayed.

2. A method according to claim 1, wherein said virtual map is generated using at least one further image, further indications of positions are received, and said position data includes a plurality of indications that pairs of positions are connected.

3. A method according to claim 1, wherein said first and second circular projections are displayed on a display device, and said indications of said positions are provided by a user drawing a line on said display device between said first position and said second position.

4. A method according to claim 1, wherein said images are captured using a spherical camera.

5. A method according to claim 1, wherein said images have an equirectangular projection.

6. A method according to claim 1, further including the step of modifying the alpha channel in said pixel information before inserting it at said point in the circle, wherein said modification is dependent on said calculated distance, such that alpha is modified for points near the edge of the circle to create a smooth edge.

7. A method according to claim 1, further comprising for each circular projection:
   instantiating a containing square enclosing said circle, and for each one point within said containing square, identifying whether said point is within said circle, and if it is, using said point to generate a circular projection.

8. A method according to claim 1, wherein said image is horizontally cropped at the top before said circular projection is generated.

9. A method according to claim 1, wherein said step of generating a circular projection includes the additional step of, for said point in said circle:
   if said calculated distance is less than a predetermined threshold, inserting no pixel information at that point in the circle,
   such that said circular projection contains a smaller blank circle at its center.

10. Apparatus for generating and supplying a virtual map, comprising a processor and a memory, wherein said processor is configured to:
    receive a first image and a second image, each of said images representing a physical space;
    generate a first circular projection of said first image and generate a second circular projection of second image, wherein said processor generates each circular projection from its corresponding image by:
    identifying a circle of a predetermined size, identifying a radial line within said circle, and for at least one point within said circle:
    calculating the angle between said radial line and said point and using said angle to identify a horizontal position within said image,
    calculating the distance from the centre of said circle to said point, and using said distance to identify a vertical position within said corresponding image, and
    extracting pixel information from said corresponding image at the identified horizontal and vertical positions, and inserting said pixel information at said point in the circle;
    output said first and second circular projections for display;
    receive an indication of a first position in said projection of said first image, and a second position in said projection of said second image, and store position data in said memory, said position data including an identification of said positions and an indication that said positions are connected;

supply said first and second images and said position data for display as the virtual map.

11. Apparatus according to claim 10, wherein said processor is further configured to:
receive at least one further image; and
receive further indications of positions;
and store in said position data a plurality of indications that pairs of positions are connected.

12. Apparatus according to claim 10, wherein said first and second images each have an equirectangular projection.

13. Apparatus according to claim 10, wherein said processor is further configured to:
modify the alpha channel in said pixel information before inserting it at said point in the circle, said modification being dependent on said calculated distance, such that alpha is modified for points near the edge of the circle to create a smooth edge.

14. Apparatus according to claim 10, wherein said processor is further configured to, while considering a point within said circle:
identify a condition to the effect that said calculated distance is less than a predetermined threshold, and in response to said identification, insert no pixel information at that point in the circle,
such that said circular projection contains a smaller blank circle at its center.

* * * * *